United States Patent
Freedman et al.

(10) Patent No.: US 12,536,186 B1
(45) Date of Patent: Jan. 27, 2026

(54) IMPLEMENTING VECTOR INDEX BUILD AND SEARCH USING QUERY OPERATORS

(71) Applicant: Microsoft Technology Licensing, LLC, Redmond, WA (US)

(72) Inventors: Craig Steven Freedman, Sammamish, WA (US); Rajkumar Iyer, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/016,870

(22) Filed: Jan. 10, 2025

(51) Int. Cl.
*G06F 16/2458* (2019.01)
*G06F 16/22* (2019.01)

(52) U.S. Cl.
CPC ...... *G06F 16/2458* (2019.01); *G06F 16/2237* (2019.01)

(58) Field of Classification Search
CPC .......................... G06F 16/2458; G06F 16/2237
USPC ......................................................... 707/769
See application file for complete search history.

(56) References Cited

U.S. PATENT DOCUMENTS

| 12,001,432 | B1 * | 6/2024 | Burger | G06F 16/24545 |
| 2019/0121891 | A1 * | 4/2019 | Fender | G06F 16/24537 |
| 2021/0319023 | A1 * | 10/2021 | Ding | G06F 16/24544 |

OTHER PUBLICATIONS

"Oracle AI Vector Search User's Guide", Retrieved from:https://docs.oracle.com/en/database/oracle/oracle-database/23/vecse/ai-vector-search-users-guide, Retrieved on: Jul. 2025, 655 Pages.
"PG vector", Retrieved from:https://github.com/pgvector/pgvector, Retrieved on: Jul. 16, 2025, 22 Pages.
Chen, et al., "SingleStore-V: An Integrated Vector Database System in SingleStore", Proceedings of the VLDB Endowment, vol. 17, Issue 12, Aug. 1, 2024, pp. 3772-3785.
Manohar, et al., "ParlayANN: Scalable and Deterministic Parallel Graph-Based Approximate Nearest Neighbor Search Algorithms", In Repository of ariv:2305.04359v2 [cs.IR] Feb. 8, 2024, 15 Pages.
Singh, et al., FreshDiskANN: A Fast and Accurate Graph-Based ANN Index for Streaming Similarity Search, In Repository of arXiv:2105.09613v1, May 20, 2021, 19 pages.
Subramanya, et al., "DiskANN: Fast Accurate Billion-point Nearest Neighbor Search on a Single Node", 33rd Conference on Neural Information Processing Systems (NeurIPS), 2019, 11 Pages.

* cited by examiner

*Primary Examiner* — Giovanna B Colan
(74) *Attorney, Agent, or Firm* — Weaver IP L.L.C.

(57) ABSTRACT

Methods, systems, and computer program products are provided that implement vector-related requests using query operators. For example, a system includes a database, a parser, a converter, an optimizer, and an execution engine. The database is associated with query operators that are non-vector-specific. The database stores a table with vector embeddings. The parser is configured to parse a request indicating a vector operation associated with the vector embeddings. The converter is configured to convert the vector operation into a logical operator tree comprising a representation of the request as a logical flow of the query operators, enabling the vector operation without vector-specific executable code or operators. The optimizer is configured to convert the logical operator tree into an executable plan. The execution engine is configured to execute the executable plan against the table with vector embeddings.

20 Claims, 8 Drawing Sheets

Base Table 400

| ID | Col1 | Col2 | ... | Col n-1 | Col n |
|---|---|---|---|---|---|
| N1 | dataN1Col1 | dataN1Col2 | ... | dataN1Coln-1 | Vector1 |
| N2 | dataN2Col1 | dataN2Col2 | ... | dataN2Coln-1 | Vector2 |
| N3 | dataN3Col1 | dataN3Col2 | ... | dataN3Coln-1 | Vector3 |
| N4 | dataN4Col1 | dataN4Col2 | ... | dataN4Coln-1 | Vector4 |
| ... | ... | ... | ... | ... | ... |

Edge Table 600

| EdgeID | SourceID | DestID |
|---|---|---|
| Edge1 | N1 | N2 |
| Edge2 | N2 | N3 |
| Edge3 | N2 | N4 |
| Edge4 | N3 | N4 |
| Edge5 | N3 | N2 |
| ... | ... | ... |

IMPLEMENTING VECTOR INDEX BUILD AND SEARCH USING QUERY OPERATORS

BACKGROUND

A database is an organized collection of data or type of data store implemented according to a database management system (DBMS), which comprises the software that interacts with end users, applications, and the database itself to capture and analyze the data. Different types of databases exist, such as relational databases, graph databases, and vector databases. Relational databases (RDBs) store data in tables with rows and columns. Graph databases store data as graphs with nodes (e.g., entities) and edges (e.g., relationships) connecting the nodes. Vector databases store data as vector embeddings comprising n-dimensional values in n-dimensional space expressing n-dimensions of features or characteristics of the vector embedded subject. Vector databases are commonly utilized with artificial intelligence (AI) applications. Regardless of the type of database, stored data may be indexed in data structures to support faster responses to database queries.

Each type of database may be associated with a different type of index and a different type of query handled by a different type of search algorithm designed to process data based on the way data is stored and/or indexed. For example, a relational database may be searched using a structured query language (SQL) to create queries processed by an SQL engine that searches a hierarchical data structure (e.g., b-tree) index. A graph database may be searched using a graph query processed by a shortest path algorithm applied to a graph index (e.g., edge index). A vector database may be searched using a vector query processed by a vector search algorithm based on similarity metrics (e.g., a nearest neighbor search) applied to a vector index. Distances between vector embedded data points in n-dimensional space indicate similarity between data points. A vector index may be hash-based, tree-based, cluster-based, space-partition-based, or graph-based, for example.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer-readable memory devices are provided that address issues related to implementing vector-related requests in non-vector-specific databases, such as relational databases.

In one aspect, a system is provided to convert vector-related requests into logical operator trees comprising query operators. The system comprises: a database, a parser, a converter, an optimizer, and an execution engine. The database is associated with query operators that are non-vector-specific. The database stores a table with vector embeddings. The parser is configured to parse a request indicating a vector operation (e.g., create vector index, vector search, delete/add vectors) associated with the vector embeddings. The converter is configured to convert the vector operation into a logical operator tree comprising a representation of the request as a logical flow of the query operators, enabling the vector operation without vector-specific executable code or operators. The optimizer is configured to convert the logical operator tree into an executable plan. The execution engine is configured to execute the executable plan against the table with vector embeddings.

In another aspect, a method of converting vector-related requests into logical operator trees comprising query operators is provided that comprises: receiving a query indicating a vector search for vector embeddings in a database associated with query operators that are non-vector-specific; determining a vector index applicable to the vector search; converting the vector search into a logical operator tree comprising a representation of the request as a logical flow of the query operators, enabling the vector search of the database; converting the logical operator tree into an executable query plan that references the vector index; and executing the executable query plan against the database by reading the referenced vector index.

In another aspect, the method comprises: receiving a request to generate a vector index for vectors in the database associated with query operators that are non-vector-specific; converting the request into a logical operator tree (e.g., either directly, or by building a series of SQL statements from the request that are transformed into one or more logical operator trees) comprising a logical flow of the query operators representing the request, enabling the generation of the vector index without vector-specific executable code or operators; converting the logical operator tree into an executable query plan (or multiple executed query plans) that references the vector index; and executing the executable query plan against the database by creating the referenced vector index.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1 shows a block diagram of an example relational database system that includes a converter configured to convert vector operations in a request into a logical query operator tree comprising a representation of the request as a logical flow of database query operators, enabling the vector operation(s) without vector-specific executable code or vector-specific operators, according to an example embodiment.

Figure 1:
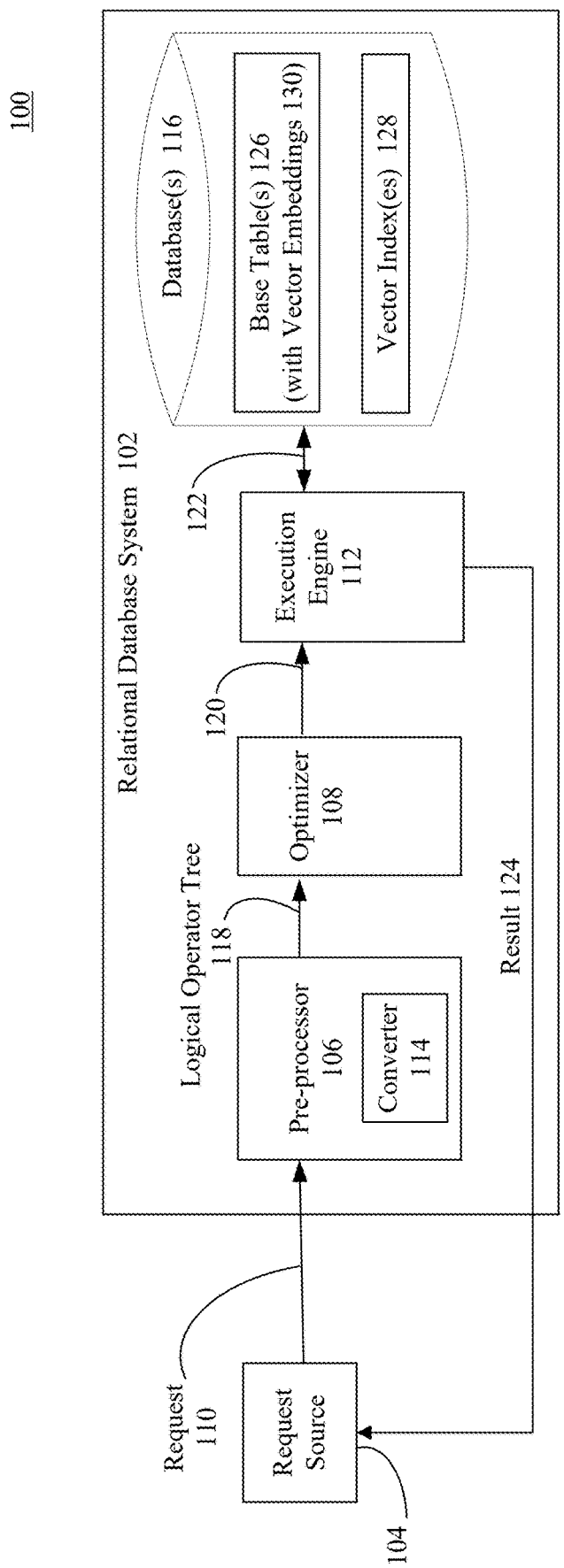

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Different types of databases exist, such as relational databases, graph databases, and vector databases. Relational databases (RDBs) store data in tables with rows and columns. Graph databases store data as graphs with nodes (e.g., entities) and edges (e.g., relationships) connecting nodes. Vector databases store data as vector embeddings comprising n-dimensional values in n-dimensional space expressing n-dimensions of features or characteristics of the vector embedded subject. Vector databases are commonly utilized with artificial intelligence (AI) applications. Regardless of the type of database, stored data may be indexed in data structures to support faster responses to database queries.

Each type of database may be associated with a different type of index and a different type of query handled by a different type of search algorithm designed to process data based on the way data is stored and/or indexed. For example, a relational database may be searched using a structured query language (SQL) to create queries processed by an SQL engine that searches a hierarchical data structure (e.g., b-tree) index. A graph database may be searched using a graph query processed by a shortest path algorithm applied to a graph index (e.g., edge index). A vector database may be searched using a vector query processed by a vector search algorithm based on similarity metrics (e.g., a nearest neighbor search) applied to a vector index. Distances between vector embedded data points in n-dimensional space indicate similarity between data points. A vector index may be hash-based, tree-based, cluster-based, or graph-based, for example.

Relational database systems may be leveraged to perform the functions of a vector database system. For example, a graph-based vector index could indicate vector embeddings stored in regular relational tables.

While an RDB may be used to store vector embeddings and/or graphs in the same or different tables as relational data, RDB operators may not be designed to index, maintain, or search vector or graph data, leading to performance problems. Writing one or more algorithms in a programming language (e.g., C++ or Rust) to index, maintain, and search vector embeddings stored in an RDB may be extremely time-consuming.

Data, such as text (e.g., words, phrases, publications), images, audio, video, etc., may be encoded for organization, storage, searching, retrieval, and processing of the data. For example, vector embeddings are numerical representations of data as n-dimensional arrays of numbers that artificial intelligence (AI), such as machine learning (ML) models, can process. Examples of such ML models are described further below with respect to FIG. 10. AI applications include voice recognition, image recognition, and chatbots. The meaning of data is captured by numerical representations in multiple dimensions. Each dimension in an n-dimensional array of numbers can represent a different characteristic or feature of the data. Complex information may be represented by high dimensional vector data. Vector numbers can represent complex objects, such as words, images, video, and audio generated by an ML model. Vectors may be clustered based on similarity, which supports vector searches. The number of vector dimensions may be, for example, 768 or 1536. In contrast, examples provided herein are simple, e.g., only a few dimensions.

A database, such as a relational database, may provide support for AI applications by providing support for vector embeddings. For example, a database may store vector embedding data generated by an embedding model algorithm. A database may also store vector metadata (e.g., data type, description). Embedding models convert data into vectors. Vectors can be grouped together, for example, based on semantic meaning or features. For example, vector embeddings may capture (e.g., in numbers in one or more dimensions) the similarity of different words, such as building and house or dog and puppy.

A database may utilize a vector index to support fast and resource efficient vector searches. A vector index is a data structure that allows quick retrieval of k vectors that are similar to a given reference vector (e.g., search/query vector created from a query). Vector indexes may be tree-based, graph-based, hash-based, quantization-based, etc. Vectors can be indexed by an algorithm, such as Inverted File Index (IVF), hierarchical navigable small world (HNSW), locality-sensitive hashing (LSH), resulting in, respectively, an IVF vector index data structure, or an HNSW vector index data structure, or an LSH vector index data structure. Vector index types may be paired with vector search algorithm types. Quantization compresses data into a smaller space. Product Quantization (PQ), for example, may be used to compress high-dimensional vectors in an index to use less memory and make nearest-neighbor searches faster. PQ is a technique known to persons skilled in the relevant arts for compressing high-dimensional vectors to use less memory, which can substantially increase nearest-neighbor search speeds.

Search algorithms may be used to search the database (e.g., index) for data responsive (e.g., similar) to a query (e.g., search terms indicating targeted information). A query may be converted into a query vector so that an algorithm can use the query vector to search stored/indexed data vectors. A search algorithm calculates distances between the query vector and stored/indexed vectors to identify and return similar results. Vector algorithms may determine vector similarity using a distance or similarity function utilizing one or more metrics (e.g., cosine, Euclidean, or dot product). The algorithm may provide a similarity ranking with vectors in the neighborhood of the query vector. The most similar vectors may be referred to as the nearest neighbors in n-dimensional space around the query vector.

For example, a k-nearest neighbors (KNN) algorithm uses vector space proximity to make classifications or predictions. KNN may be used to determine and retrieve the k nearest neighbors of a target indicated by a query from a dataset in n-dimensional vector space. KNN is increasingly computationally expensive (e.g. in terms of processing time, memory, response delay/latency) because there are no known "exact" vector index algorithms. Accordingly (e.g., to reduce computation costs and latency), a K approximate nearest neighbors (ANN) algorithm may be used to retrieve an approximate list of k nearest neighbors, enabling the avoiding of scanning through an entire set of vectors. Given a query vector, the goal of a nearest neighbor (NN)) search is to report the vectors stored in the database that are closest to this query vector based on some distance metric. This distance is normally computed by metrics such as cosine similarity, which is widely used in AI (artificial intelligence) systems to calculate the closeness (or similarity) of two vectors based on the angle between them. NN search generally returns the top results, such the 10 closest vectors, ordered from nearest to furthest. However, standard methods for NN search significantly struggle with scale when working with millions or billions of high-dimensional vectors and are usually very computationally intensive. ANN is a method of NN that attempts to make the searching process more efficient by trading some accuracy for increased speed. ANN techniques use shortcuts such as specially constructed data structures or indexes to approximate the result quickly. While not necessarily 100% accurate, ANN is above 90% accurate in many cases. In many real-world scenarios, ANN methods work well because they deliver relevant results, even if not entirely precise. This makes ANN particularly effective in cases where speed matters more than perfect accuracy. While ANN is more efficient than exact NN search, ANN can be computationally burdensome at scale. Furthermore, most ANN algorithms use large amounts of RAM (random access memory) to execute searches in a very short time. Furthermore, high-dimensional data is often sparse, making it hard to partition or cluster effectively, and thus an ANN technique may need to be carefully tuned and optimized to achieve good performance over such high-dimensional data.

An example of an ANN vector index is DiskANN. DiskANN is an approach for searching approximate nearest neighbors developed to work with SSD (solid state device) storage. DiskANN enables fast and accurate ANN searches while using less RAM and without using special hardware. DiskANN is scalable, with a low cost, small memory footprint, low latency, and support for transactional workloads, which allows an index to be updated without accuracy and performance degradation over time.

Retrieval augmented generation (RAG) utilizes vector search (e.g., by an AI application). RAG supports large language models (LLMs) by retrieving information from knowledge bases (e.g., vector embeddings stored in searchable databases that AI may not be trained on) to improve the accuracy of an AI response.

Vector search algorithms, such as DiskANN, may be implemented in conventional programming languages, such as C++ or Rust. It is a time-consuming and expensive process to build a product that implements such vector search algorithms. Vector search algorithms often require a large amount of memory to cache the entire vector dataset along with an index in main memory. If insufficient memory is available, vector search implementations typically fail.

Embodiments are described with respect to performing vector-related algorithms, such as a vector index build algorithm and a vector search algorithm (e.g., DiskANN, k-means, space partitioning, HNSW), using database query operators, such as RDB (e.g., SQL) operators, that are non-vector-specific. For example, in response to a vector request, instead of calling a program written in C++ or Rust to execute a vector-specific algorithm, the vector request is converted or translated into a logical operator tree that represents the request as a logical flow of the query operators, enabling a database to perform vector operations without vector-specific executable code or vector-specific operators. For example, an aspect of DiskANN (e.g., robust prune) may be modeled with operators as a new type of aggregate function. There is a distinction between aggregate functions and operators. An aggregate function could be COUNT, SUM, AVG, MIN, MAX, etc. When a query is received with an aggregate function, an aggregate operator may be added to the plan. The same aggregate operators may be used to implement all aggregate functions. Prune uses a new aggregate function rather than a new aggregate operator.

As described above, the use of DiskANN techniques for vector search enables a very efficient search process capable of returning approximate nearest neighbors in real time while consuming less RAM than other approaches. DiskANN is scalable, with a low cost, small memory footprint, low latency, and support for transactional workloads, which allows an index to be updated without accuracy and performance degradation over time.

Furthermore, one or more (e.g., small) portions of vector-related algorithms may be implemented by coding (e.g., in C++), such as, for example, a PQ vector distance built-in function (e.g., similar to vector_distance) and/or a prune aggregate (e.g., for a vector index build operation).

Still further, one or more query operators may be enhanced (e.g., with new logic) for vector-related operations, such as enhancing a sort operator to improve (e.g., optimize) a PQ distance computation. For example, an in-memory sort operator may be enhanced (e.g., modified) to compute multiple PQ vector distances in a single pass, which may be much faster due to improved exploitation of CPU cache locality. The cache friendly algorithm can be embedded in a query operator. Further, a DiskANN index build includes a robust_prune algorithm that may be modeled as an aggregate function that takes a set of vectors as inputs and returns a pruned set of vectors as output, which enables implementation of an index build algorithm using query operators in a manner similar to a query operator implementation of a vector index search algorithm.

In embodiments, a multipurpose database is enabled that supports vector search, thereby enabling RAG and other AI applications. A multipurpose database (e.g., SQL server) supports hybrid searches (e.g., queries that mix vector search criteria, graph search criteria, RDB search criteria, and/or full text search criteria), which provides RAG support for AI applications while leveraging sophisticated query optimization and execution capabilities of the multipurpose database that models vector-related operations/algorithms as logical query operator trees. The simplified implementation of vector-related operations in a multipurpose database system stems from, at least in part, an ability to reuse database query operators to model/implement a multitude of vector-related algorithms without writing vector-specific algorithms. Such embodiments of implementing (e.g., modeling, mapping, translating or converting) vector-related requests/operations in a multipurpose database (e.g., non-specific vector database) as logical query operator trees (e.g., as opposed to coded vector-specific algorithms) impart benefits or advantages, including simplified implementation of vector-related operations/algorithms, seamless integration with the database components, and/or computation scaling.

Embodiments are described herein in terms of generating a query plan to create a vector index, maintain a vector index (e.g., maintain vector node and edge tables), search a vector index, etc. While examples discuss query operator implementation of graph-based vector indexes and multi-step recursive queries, embodiments are not limited to performing query operator implementation of graph-based vector indexes and multi-step recursive queries, as will be discussed in more detail below.

Embodiments further enable seamless integration with existing database components including an ability to use the query optimizer (QO) and resource management (e.g., for memory grants and intelligent query processing features such as memory grant feedback) for vector-related algorithms. QO subcomponents, including cardinality estimation and costing, may be leveraged for vector-related operations. Furthermore, in embodiments, computation scaling may be implemented without a lower bound. Although query operators may spill if there is insufficient memory, impacting performance, this tradeoff is similar to the tradeoff for non-vector query execution. This contrasts with existing implementations of vector-specific algorithms that require enough memory to cache an entire vector dataset (e.g., or a compressed form of vectors, such as PQ vectors) along with an index (e.g., a graph) in main memory, where the implementation will fail if insufficient memory is available.

Embodiments are now described with reference to figures, beginning with FIG. 1.

FIG. 1 shows a block diagram of a system 100 that includes an example relational database system 102 that includes a converter 114 configured to convert vector operations in a request 110 into a logical query operator tree 118 comprising a representation of the request as a logical flow of database query operators, enabling the vector operation(s) without vector-specific executable code or vector-specific operators, according to an example embodiment. In various implementations, the logical query operators may represent a multi-step sequence (e.g., with predicate steps, recursive steps, final steps, etc.) with execution paths resulting in one or more query results or sub-results. Other structural and operational embodiments will be apparent to persons skilled in the relevant art(s) based on the following discussion.

As shown in FIG. 1, system 100 includes relational database system 102 and a request source 104. Relational database system 102 includes a query pre-processor 106, a query optimizer 108, a query execution engine 112, and one or more relational databases 116. Furthermore, pre-processor 106 includes converter 114. Query optimizer 108 or converter 114 may implement or may include, for example, a multi-step query plan generator (not shown in FIG. 1). Query execution engine 112 may implement or may include, for example, a multi-step query plan executor (not shown). Query pre-processor 106 may be coupled to a request source 104, which may be a request input entity (e.g., computer), a storage location with one or more requests, etc. These features of relational database system 102 are described as follows.

In embodiments, query pre-processor 106 of relational database system 102 as shown in FIG. 1 is configured to accept (e.g., receive, access) a request 110 from request source 104. Examples of vector-related requests in request 110 include, for example, one or more of the following: create a table with vector embeddings, add one or more vector embeddings, delete one or more vector embeddings, create a vector index, perform a vector search, and so on. The terms request and query may be used interchangeably herein, where a query may not be limited to a search of stored information.

Relational database system 102 is described as follows for illustrative purposes with respect to one or more requests, but other requests may be received and processed by system 102 in embodiments. Request source 104 may provide request 110 local to relational database system 102 (e.g., from a terminal or Microsoft SQL Server Management Studio), or remotely via a network, such as, for example, the Internet. A network may comprise one or more networks, such as local area networks (LANs), wide area networks (WANs), enterprise networks, and may include wired and/or wireless portions. Examples of computing devices that may be used to provide queries to relational database system 102 include, for example and without limitation, desktop computers, laptop computers, tablet computers, netbooks, smartphones, wearable computing devices, etc.

Although relational database system 102 is depicted as a monolithic component, relational database system 102 may be implemented as any number of computing devices, e.g., including servers, and may include any type and number of other resources, e.g., including resources that facilitate communications with and between computing devices connected via networks as described above. In embodiments, servers implementing relational database system 102 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, servers that comprise relational database system 102 may be co-located (e.g., housed in one or more nearby buildings with associated components such as backup power supplies, redundant data communications, environmental controls, etc.) to form a datacenter, or may be arranged in other manners. Accordingly, in an embodiment, relational database system 102 may comprise a datacenter in a distributed collection of datacenters.

Figure 3:
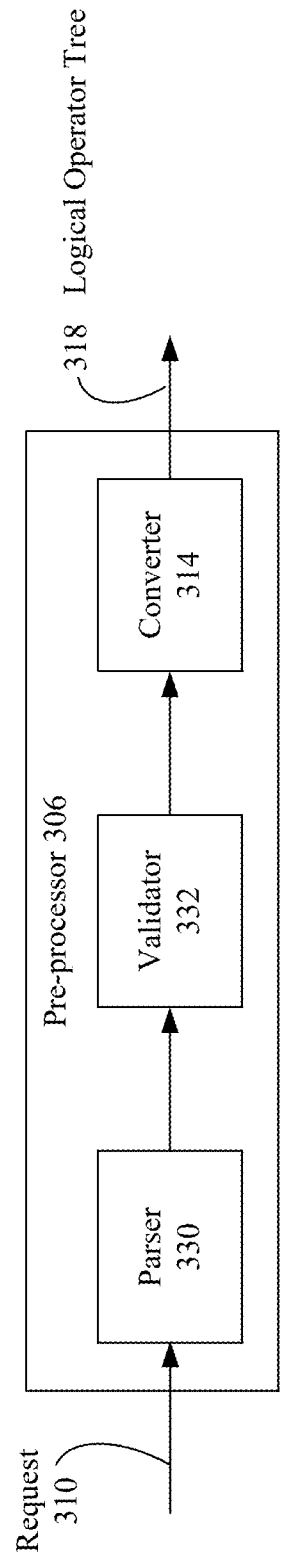
FIG. 3 shows a block diagram of an example of a pre-processor including a converter configured to convert vector operations in a request into one or more logical query operator trees, according to an example embodiment.

As shown in FIG. 1, query pre-processor 106 is configured to receive request 110 submitted by or accessed from request source 104 and to perform certain operations thereon to generate a logical representation of the query using query operators that is suitable for further processing by query optimizer 108. Such operations may include, but are not limited to, parser, validator, and algebrizer operations performed by parser, validator, and algebrizer components (not shown in FIG. 1 for simplification), although FIG. 3 shows an example implementation of pre-processor 106. Note that algebrizer refers to one or more components responsible at least for binding of logical identifiers to physical entities in the database (objects, tables, columns, etc.), semantic validation of an input query (i.e., that a syntactically valid query follows the rules of the language), and data type derivation for scalar expressions.

As shown by example in FIG. 1, converter 114 generates a logical operator tree 118 based on request 110. Logical operator tree 118 is a logical representation of request 110. In an embodiment, logical operator tree 118 may be obtained by translating the original text of request 110 into a tree structure with leaf nodes of query operators for relational database system 102. Pre-processor 106 outputs the logical operator tree 118 to optimizer 108. Optimizer 108 is configured to receive logical operator tree 118 output by query pre-processor 106, and to process logical operator tree 118 to generate query plan 120 for the request 110. The query plan 120 is received and executed by execution engine 112, which accesses database(s) 116 (e.g., via communication 122) as indicated by the query plan 120. Execution engine 112 returns a result 124 of the execution of query plan 120 to request source 104 and/or to a destination indicated by request 110.

The logical operator tree 118 may be represented as a graphical logical operator tree (not shown). Optimizer 112 may be configured to turn the logical operator tree 118 for vector index creation into an optimized query plan (e.g., physical operator tree) 120 as follows, edited for simplification, highlighting sections [1], [2], [3], [4], and [5]:

```
[1]
   |--Table Insert(OBJECT:([#queries]), SET:([qid] = [graphnode].[id],[qembedding] =
[graphnode].[embedding]))
       |--Top(TOP EXPRESSION:([@batchsize])
           |--Clustered Index Seek(OBJECT:([graphnode]), SEEK: ([graphnode].[id] >
[@id]) ORDERED FORWARD)
[2]
   |--Clustered Index Insert(OBJECT:([graphedge]), SET:([src_id] =
[q1].[qid],[pruned_dest_ids] = [Expr1052], [new_dest_ids] = [Expr1053]))
      |--Compute Scalar(DEFINE:([Expr1053]=0x))
         |--Parallelism(Gather Streams)
            |--Table Spool
               |--Nested Loops(Inner Join)
                  |--Parallelism(Repartition Streams, RoundRobin Partitioning)
                  |   |--Table Scan(OBJECT:([#queries] AS [q1]))
                  |--Compute Scalar(DEFINE:([Expr1052]=DiskANNPrune([Expr1058])))
                     |--Stream
Aggregate(DEFINE:([Expr1058]=DISKANNPRUNEACCUM([Union1047],[Union1048
],[Union 1049],[Union1050],[Union 1051],'euclidean',[@R],(0),[@alpha])))
                        |--Merge Join(Concatenation)
                           |--Nested Loops(Left Outer Join)
                           |   |--Filter(WHERE:([q1].[qid]<>[vector1_queue].[id]))
                           |   |   |--Sequence
                           |   |      |--Clustered Index Insert(OBJECT:(vector1_queue AS
[q]), SET:([id] = [graphnode].[id],[distance] = [Expr1008], [iteration] = [Expr1009]))
                           |   |   |   |--Compute
Scalar(DEFINE:([Expr1008]=vector_distance(N'euclidean',[graphnode].[embedding],[q1]
.[qembedding]), [Expr1009]=(1)))
                           |   |   |         |--Clustered Index Seek(OBJECT:([graphnode]),
SEEK:( [id]=(0))
                           |   |      |--Clustered Index
Insert(OBJECT:(vector1_candidate), SET:([id] = [vector1_queue].[id]))
                           |   |   |   |--Clustered Index
Update(OBJECT:(vector1_queue), SET:([iteration] = [Expr1015]))
                           |   |   |         |--Compute Scalar(DEFINE:([Expr1015]=(0)))
                           |   |   |            |--Top(TOP EXPRESSION:([@m]))
                           |   |   |               |--
Filter(WHERE:([vector1_queue].[iteration]>(0)))
                           |   |   |                  |--Clustered Index
Scan(OBJECT:(vector1_queue), ORDERED FORWARD)
                           |   |      |--Clustered Index Insert(OBJECT:(vector1_queue2),
SET:([id] = [vector1_queue].[id],[distance] = [vector1_queue].[distance],[iteration] =
[vector1_queue].[iteration]))
                           |   |   |   |--Clustered Index Scan(OBJECT:(vector1_queue))
                           |   |      |--Clustered Index Insert(OBJECT:(vector1_queue),
SET:([id] = [graphnode].[id],[distance] = [Expr1033],[iteration] = [Expr1035]))
                           |   |   |   |--Compute Scalar(DEFINE:([Expr1035]=(1)))
                           |   |   |      |--Top(TOP EXPRESSION:([@]]))
                           |   |   |         |--Sort(ORDER BY:([Expr1033] ASC))
                           |   |   |            |--Compute
Scalar(DEFINE:([Expr1033]-vector_distance(N'euclidean',[graphnode].[embedding],[q1]
.[qembedding])
                           |   |   |               |--Nested Loops(Inner Join))
                           |   |   |                  |--Merge Join(Left Anti Semi Join,
MERGE:(UNPACK_INT.[value])=([q].[id]),
RESIDUAL:([q].[id]=UNPACK_INT.[value]))
                           |   |   |                     |--Sort(DISTINCT ORDER
```

```
BY:(UNPACK_INT.[value] ASC))
                  |   |    |                     |   |   |--Nested Loops(Inner Join)
                  |   |    |                     |   |     |--Nested Loops(Inner
Join)
                  |   |    |                     |   |   |   |--Compute
Scalar(DEFINE:([graphedge].[dest_ids]=[graphedge].[pruned_dest_ids]|[graphedge].[ne
w_dest_ids]))
                  |   |    |                     |   |    |   |--Clustered Index
Scan(OBJECT:([graphedge]))
                  |   |    |                     |   |    |   |--Clustered Index
Seek(OBJECT:(vector1_candidate AS [c]), SEEK:([id]=[graphedge].[src_id]) ORDERED
FORWARD)
                  |   |    |                     |   |     |--Table-valued function
                  |   |    |                     |   |--Clustered Index
Scan(OBJECT:(vector1_queue2 AS [q]), ORDERED FORWARD)
                  |   |    |                     |--Clustered Index
Seek(OBJECT:([graphnode]), SEEK:([id]=UNPACK_INT.[value]) ORDERED
FORWARD)
                  |   |    |--Top(TOP EXPRESSION:((1))
                  |   |    |   |--Filter(WHERE:([vector1_queue].[iteration]=(1)))
                  |   |    |      |--Top(TOP EXPRESSION:([@1]))
                  |   |    |         |--Clustered Index
Scan(OBJECT:(vector1_queue), ORDERED FORWARD)
                  |   |    |--Filter(WHERE:([vector1_queue].[iteration]=(0)))
                  |   |       |--Clustered Index Scan(OBJECT:(vector1_queue),
ORDERED FORWARD)
                  |    |--Clustered Index Seek(OBJECT:([graphnode]),
SEEK:([id]=[vector1_queue].[id]) ORDERED FORWARD)
                  |--Top(TOP EXPRESSION:([@R]))
                     |--Sort(ORDER BY:([Expr1046] ASC))
                        |--Compute
Scalar(DEFINE:([Expr1046]=vector_distance([@algo],[q1].[qembedding],[q2].[qembedd
ing])))
                           |--Table Scan(OBJECT:([#queries] AS [q2]),
WHERE:([q1].[qid]<>[q2].[qid]))
[3]
  |--Clustered Index Update(OBJECT:([graphedge] AS [e]), SET:([new_dest_ids] =
[Expr1003]))
     |--Parallelism(Gather Streams)
        |--Table Spool
           |--Compute Scalar(DEFINE:([Expr1003]-[e].[new_dest_ids]|[Expr1001]))
              |--Nested Loops(Inner Join)
                 |--Stream Aggregate(GROUP BY:(UNPACK_INT.[value])
DEFINE:([Expr1001]=PACKINT([t].[src_id],NULL)))
                 |   |--Sort(ORDER BY:(UNPACK_INT.[value] ASC))
                 |      |--Filter(WHERE:(UNPACK_INT.[value]<=[@id]))
                 |         |--Parallelism(Repartition Streams, Hash Partitioning,
PARTITION COLUMNS:(UNPACK_INT.[value]))
                 |            |--Nested Loops(Inner Join)
                 |               |--Compute
Scalar(DEFINE:([t].[dest_ids]=[t].[pruned_dest_ids]|[t].[new_dest_ids]))
                 |               |   |--Clustered Index Seek(OBJECT:([graphedge] AS
[t]), SEEK:([src_id] > [@id]) ORDERED FORWARD)
                 |                  |--Table-valued function
                 |--Clustered Index Seek(OBJECT:([graphedge] AS [e]),
SEEK:([src_id]=UNPACK_INT.[value]), WHERE:([e].[src_id] <= [@id]) ORDERED
FORWARD)
[4]
  |--Compute Scalar(DEFINE:([Expr1005]=[Expr1003]))
     |--Stream Aggregate(DEFINE:([Expr1003]=MAX([#queries].[qid])))
        |--Table Scan(OBJECT:([#queries]))
[5]
  |--Clustered Index Update(OBJECT:([graphedge] AS [e]), SET:([pruned_dest_ids] =
[Expr1011],[new_dest_ids] = [Expr1012]))
     |--Compute Scalar(DEFINE:([Expr1012]=0x))
        |--Parallelism(Gather Streams)
           |--Nested Loops(Inner Join)
              |--Nested Loops(Inner Join)
              |  |--Parallelism(Repartition Streams, RoundRobin Partitioning)
              |  |   |--Filter(WHERE:([Expr1016]>[@maxlen]))
              |  |      |--Compute
Scalar(DEFINE:([Expr1016]=datalength([e].[new_dest_ids])))
              |  |         |--Clustered Index Scan(OBJECT:([graphedge] AS [e]))
              |  |--Clustered Index Seek(OBJECT:([graphnode] AS [n1]),
SEEK:([id]=[e].[src_id]) ORDERED FORWARD)
                 |--Compute Scalar(DEFINE:([Expr1011]=DiskANNPrune([Expr1018])))
                    |--Stream
```

-continued

```
Aggregate(DEFINE:([Expr1018]=DISKANNPRUNEACCUM([Union1006],[Union1007
],[Union1008],[Union1009],[Union1010],'euclidean',[@R],(0),[@alpha])))
            |--Merge Join(Concatenation)
                |--Compute
Scalar(DEFINE:([Expr1003]=vector_distance([@algo],[n1].[embedding],[n2].[embeddin
g],UNPACK_INT.[ordinal])))
            |   |--Nested Loops(Inner Join)
            |       |--Table-valued function
            |       |--Clustered Index Seek(OBJECT:([graphnode] AS [n2]),
SEEK:([id]=UNPACK_INT.[value]) ORDERED FORWARD)
                |--Sort(ORDER BY:([Expr1005] ASC))
                    |--Compute
Scalar(DEFINE:([Expr1005]=vector_distance([@algo],[n1].[embedding],[n2].[embeddin
g])))
                        |--Nested Loops(Inner Join)
                            |--Table-valued function
                            |--Clustered Index Seek(OBJECT:([graphnode] AS [n2]),
SEEK:([id]=UNPACK_INT.[value]) ORDERED FORWARD)
```

Portions [1]-[5] are summarized as the following operations:

[1] Fetch the next batch of vectors to insert into the index.

[2] For each new (source) vector in the set of vectors fetch by [1], generate a set of candidates for new forward edges from the new (source) vector to existing (destination) vectors by executing a search of the current graph and to other (destination) vectors in the current batch fetched by [1]. Sort each set of candidate edges associated with the same new (source) vector by ascending distance from source vector to destination vector. Use the prune aggregate to reduce the set of candidate forward edges to at most R edges per new vector. The prune aggregate preserves the sort order of the edges. Insert the reduced set of pruned new edges into the graph edge table.

[3] For each new forward edge created by [2] excluding edges to the vectors fetched by [1], generate a new backward edge by switching the source and destination. For example, a vector from v_new to v_old is converted into a vector from v_old to v_new. Insert these vectors (without invoking the prune aggregate) into the graph edge table.

[4] Determine the starting vector for the next batch of vectors to be fetched by [1]. While not captured in the operator trees, steps [1] through [4] run in a loop until there are either no more vectors or it is time to run step [5] to prune the new backward edges. The decision when to run step [5] can be based on a variety of factors such as if the number of accumulated new backward edges that have yet to be pruned exceeds a selected threshold or if the performance of the vector search in step [2] is degrading due to the presence of too many unpruned backward edges.

[5] Find (source) nodes in the graph that have more than a selected threshold of new unpruned backward edges. For each (source) node exceeding the selected threshold, sort the unpruned edges by ascending distance from the source vector to the destination vector and merge these unpruned edges with the (already sorted) previously pruned edges into a single sorted set of edges. Use the prune aggregate to reduce the set of edges to at most R edges per source node. The prune aggregate preserves the sort order of the edges. Update the graph edge table replacing the previously pruned edges with the reduced set of pruned new edges and clearing the set of unpruned edges.

Vector index(es) 128 may not be implemented within database(s) 116 as an additional access method (e.g., similar to Btree or Column Store). Vector index(es) 128 may, instead, be built over a tabular or relational interface (e.g., on top of queryable internal tables with corresponding metadata, populated via internal transactions) using relational operators (e.g., as a Full-Text (FT) index and SQL Graph), which may avoid the complexity and time-consuming nature of adding a new access method in SQL that would require extensive interaction with subsystems, such as logging, buffer management, and locking. Algorithms (e.g., DiskANN) may be implemented over the relational interface using SQL, for example. Algorithms (e.g., DiskANN original build and search algorithm) may be built as in-memory data structure, which may improve performance while using more memory. The PQ index and graph may be stored as tables on disk (e.g., in database(s) 116), while some components of the index may be cached as in-memory data structures.

One or more kinds of information may be stored for an index, e.g., index properties and index metadata. Index properties may include a configuration, constants, runtime-states information stored or passed related to the index to govern how an index is created/maintained/rebuilt and for dealing with deletes, asynchronous update, batch, and concurrent DML. Information may be stored variously, e.g., some as part of index metadata, some system defined, and/or inferred based on the request. Index Metadata may include information specific to a vector index and/or general to multiple indexes of one or more types of indexes, e.g., type of index. KNN-PQ, DiskANN, DiskANN-PQ, IVF, IVF-PQ.

Figure 2:
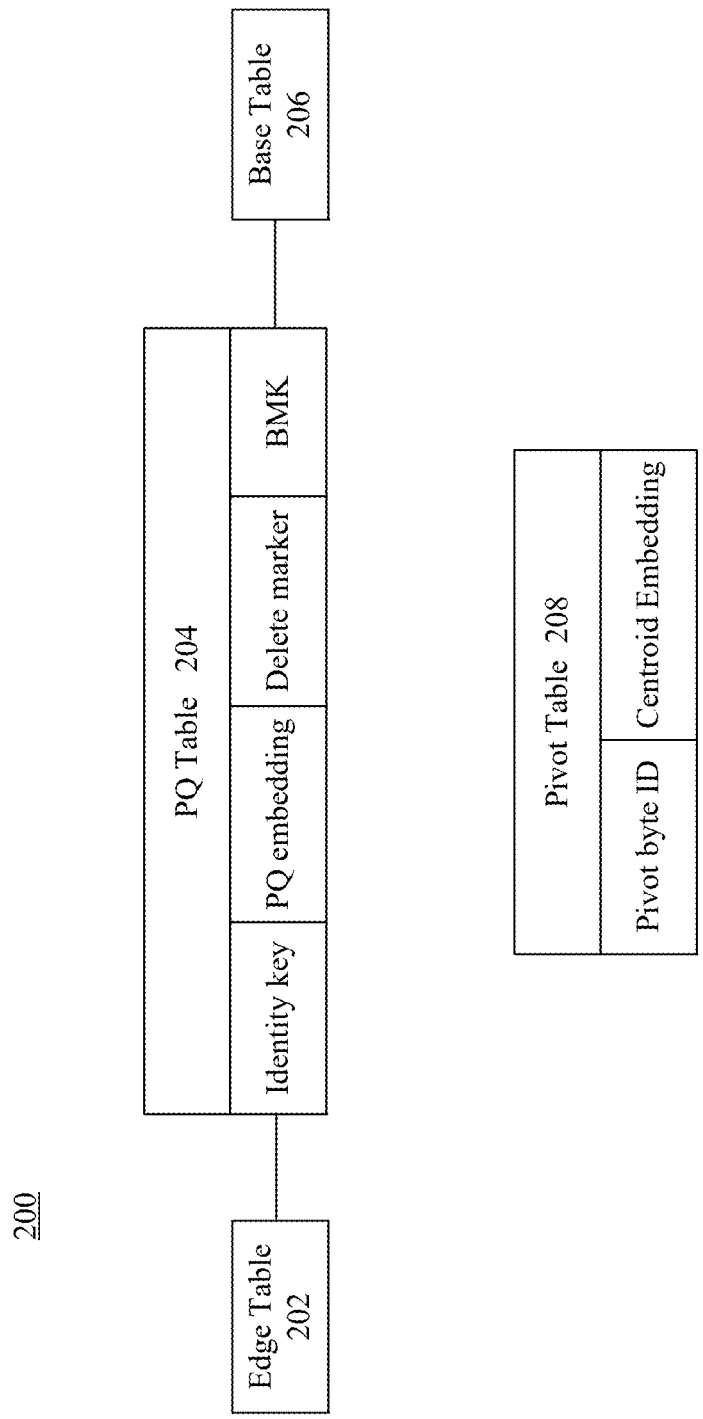
FIG. 2 shows a block diagram example of a non-clustered index implemented as tables in a relational database, according to an example embodiment.

For purposes of illustration, FIG. 2 shows an example of an ANN index 200 for DiskANN implemented as tables in a relational database, according to an example embodiment. As shown in FIG. 2, example ANN index 200 includes edge table 202, a PQ table 204, a base table 206, and a pivot table 208. Example ANN index 200 may include one or more other tables not shown, such as a deref_table, a meta-table, which may be internal tables created during index creation.

Edge table 202 may be an internal table. Edge table 202 may be referred to as an index table (e.g., syntax index_table).

PQ table 204 may be an internal table. PQ table 204 may include, for example, an identity key, a PQ embedding, a delete marker, and a bookmark (BMK). The identity key may be, for example, an eight (8) byte identity value. The identity key may be unique for each row in the table. The PQ embedding may be a compressed representation of a vector embedding in the base table 206. The bookmark may reference a row in the base table 206 where the underlying vector embedding is located. The delete marker may be, for example, one (1) byte indicating whether the PQ embedding is subject to deletion. A graph search utilizing PQ table 204 may use a PQ vector (PQ embedding) while re-ranking of nearest neighbors may be performed using a full vector (from the base table).

Base table 206 shows an example of base table 126 of FIG. 1.

Pivot table 208 may be a table or metadata. Pivot table 208 may be used to store quantization code book which is used to generate a quantized vector from a full precision vector.

For example, if request 110 includes a request to create a table with vector embeddings, execution engine 112 may create base table(s) 126 with vector embeddings 130. In some examples, base table(s) 126 may be referred to as node table(s), e.g., given utilization of base table(s) 126 in a graph-based index.

For example, if request 110 includes a request to add or delete one or more vector embeddings, execution engine 112 may modify base table(s) 126 with vector embeddings 130 (e.g., add one or more vector embeddings to vector embeddings 130, and/or deleted one or more vector embeddings from vector embeddings 130).

For example, if request 110 includes a request to create a vector index, execution engine 112 may create vector index(es) 128 based on vector embeddings 130 in base table(s) 126. In some examples, vector index(es) 128 may include table(s) with graph edges, e.g., for a graph-based index.

For example, if request 110 includes a request to perform a vector search, execution engine 112 may search vector index(es) 128. Execution engine 112 may return a result 124 in response to request 110. For example, result 124 may be query results if request 110 included a vector search request.

FIG. 3 shows a block diagram of a pre-processor 306, according to an example embodiment. Pre-processor 306 is an example of pre-processor 106 of FIG. 1. As shown in FIG. 3, pre-processor 306 includes a parser 330, a validator 332, and a converter 314. These features of pre-processor 306 are described in further detail as follows.

Query pre-processor 306 is configured to receive a request 310 submitted by or accessed from a request source (e.g., request source 104) and to perform certain operations thereon to generate a logical representation of the query using query operators that is suitable for further processing by a query optimizer (e.g., query optimizer 108). As shown in FIG. 3, the operations may include but are not limited to operations implemented by parser 330 validator 332, and converter 314.

Parser 330 parses request 110 into constituent parts that may be validated. Request 110 may be based on a syntax, as may be defined by a structured query language (SQL). For example, request 110 may include one or more requests associated with non-vector data and one or more requests associated with vector data in database(s) 116.

Validator 332 validates the constituent parts of the request 110 to confirm the request 310 is a valid request to perform one or more known operations on known information, such as base table(s) 126 and/or vector index(es) 128, or other accessible information.

Converter 314 converts, translates, maps, or otherwise represents (e.g., parsed, validated) request 110 as a logical operator tree 318 of query operators associated with the database (e.g., relational database system 102). For example, converter 314 maps the one or more operations evident in request 110 to a hierarchical tree of query operators (indicated by logical operator tree 318) that represent a logical flow of the requested vector operation(s), such as create a table with vector embeddings, add one or more vector embeddings, delete one or more vector embeddings, create a vector index, perform a vector search, and so on. The query operators in logical operator tree 318 may include, for example, table accesses for vector embeddings and internal nodes representing relational operators, such as relational join. The operators may reference base table(s) 126 and/or vector index(es) 128 as input, depending on the requested operation(s) commensurate with or otherwise indicated by request 110. Logical operator tree 318 may express logical operators in one or more forms, such as textual (e.g., pseudocode) and/or graphical.

Figures 4, 5, 6:
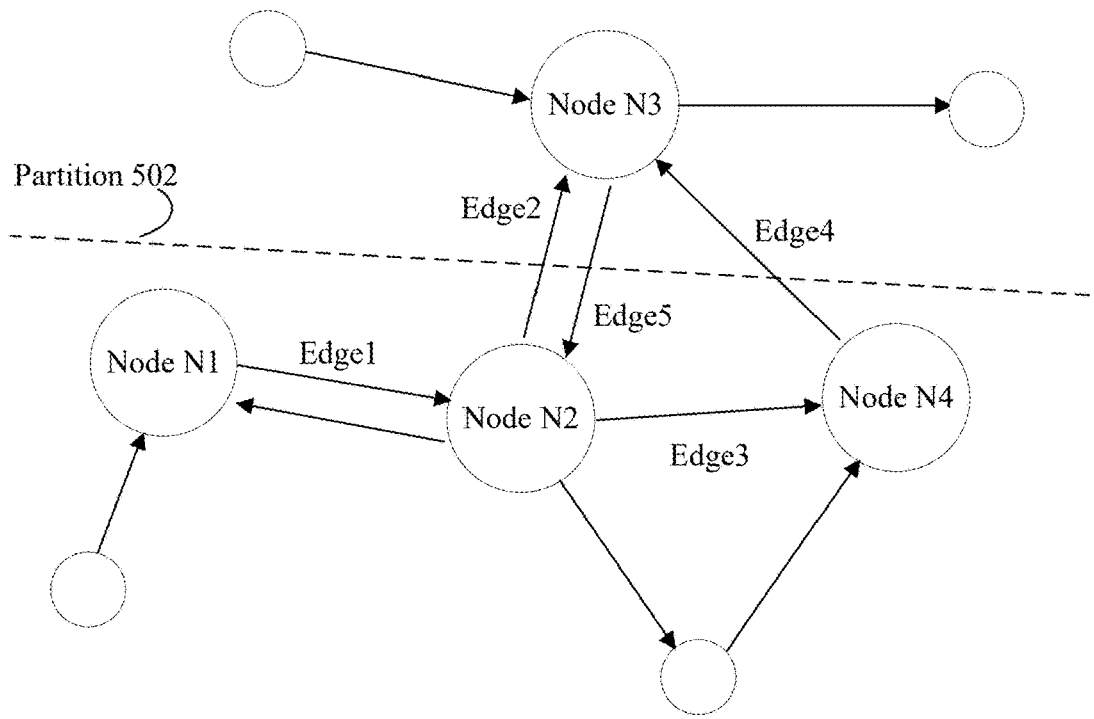
FIG. 4 shows an example of vector embedding data stored in a base table, according to an example embodiment.
FIG. 5 shows an example graph of vectors in n-dimensional vector space, according to an example embodiment.
FIG. 6 shows an example of an edge table for a graph-based index of vector embeddings in one or more base tables, according to an example embodiment.

FIGS. 3-5 show simplified examples of information stored by base table(s) 126 and vector index(es) 128.

FIG. 4 shows a base table 400 that stores examples of vector embedding data, according to an example embodiment. Base table 400 is an example of base table(s) 126 shown in FIG. 1 and base table 206 shown in FIG. 2 and may also be referred to as a node table. A user or an automated program may generate base table 400. As shown by example base table 400 in FIG. 4, there may be n columns of data, where one (1) to n columns may include vector embeddings. For simplicity, column n shows vector embeddings vector1-vector4, while other columns one (1)-n-1 may or may not include vector embeddings. Rows of data including vector1-vector4 are identified by an identifier (ID), e.g., N1, N2, N3, N4, etc., which represent node 1, node 2, node 3, node 4, etc. shown in graph 500 in FIG. 5. Base tables in various embodiments may use the same or a different format as example base table 400.

FIG. 5 shows an example graph 500 of vectors in n-dimensional vector space, according to an example embodiment. Graph 500 is a graph of vector embeddings vector1-vector4 shown in column n of base table 400. Graph 500 shows edges (e.g., relative distance relationships) between vectors (nodes) vector1-vector4. As indicated in graph 500, vector embeddings in base table 400 may be indexed, for example, in a graph-based index or a partition-based index. Graph 500 includes nodes N1-N4 and edges edge1-edge5 between nodes N1-N4. As described briefly above, nodes N1 through N4 identify vector embeddings vector1-vector4 (e.g., referred to herein as vectors). Edge1 through edge5 represent relationships between nodes N1-N4. For example, edges edge1 through edge5 represent corresponding relationships between nodes N1 through N4. Graph 500 visualizes data stored in base table 400 and an edge table 600 shown in FIG. 6. Data that embodies graph 500 may be stored differently than what is illustrated in graph 500, base table 400, and edge table 600. Graph 500 also shows a partition 502 as a dashed line dividing vector embeddings to indicate that vector embeddings in base table 400 may (e.g., alternatively) be partitioned into various partitions for indexing and searching in a different manner than in a graph-based index. In embodiments, after base table 400 and edge table 600 have been created and persisted to a (e.g., relational) database system, a user may seek to execute graph search/query requests, maintenance requests, etc. against the data. Regardless of the type of indexing and searching implemented for vector embeddings in base table 400, requests that include vector operations can be converted into a logical operator tree of database query operators, as described herein.

Note that in an embodiment, edges in graph 500 are directional, such as is represented by arrows in FIG. 5. For instance, edge1 is directional from node N1 to node N2. Furthermore, edge2 is directional from node N2 to node N3. Furthermore, in some or all instances, edges may be bidirectional between a pair of nodes, although this is not required. For instance, as mentioned, edge2 is directional from node N2 to node N3. Furthermore, edge5 is directional from node N3 to node N2. In another example, though, edge3 is directional from node N2 to node N4, while another edge is not present that is directional from node N4 to node N2.

The relationships between nodes and edges may be maintained (e.g., stored) in any suitable manner. For instance, FIG. 6 shows an edge table 600 for a graph-based index of vector embeddings in one or more base tables, according to an embodiment. Example edge table 600 is a graph-based index example of vector index(es) 128 shown in FIG. 1, and is an example of edge tables 202 and 600 of FIGS. 2 and 6, respectively. Edge table 600 indicates the associated source and destination identifiers (SourceID, DestID) for nodes (e.g., nodes N1-N4) associated with edges edge1-edge5, etc., maintained in edge table 600, and optionally includes an edge identifier (edgeID) for each edge in graph 500. Edge table 600 may be stored in a (e.g., relational) database along with base table 400. When present, the edgeID in each row uniquely identifies each edge. Edge table 600 may be generated, for example, in response to a request to generate a graph-based ANN vector index based on vector embeddings in base table 400. For example, the request may be converted into a logical operator tree of query operators in a logical flow that implements DiskANN, including the Vamana algorithm associated with DiskANN, which, during execution, identifies edges edge1-edge5 between vectors vector1-vector4 (e.g., nodes N1-N4), e.g., among other edges between vector1-vector4 and/or other vectors, iteratively building and pruning edges in edge table 600. Vamana creates a relative neighborhood graph (RNG). Edges in the RNG are constructed iteratively. Vamana implements a greedy search procedure for nearest neighbors to a vector and a robust prune procedure to optimize a graph for vector searches.

In another embodiment, the relationships between nodes and edges may be maintained in an adjacency list. In such an adjacency list, the one or more nodes that are adjacent to (connected by a single arrow) a node are listed with the node. For instance, the node-edge relationships of edge table 600 of FIG. 6 may be maintained in the following adjacency list: (N1, {N2}), (N2, {N3,N4}), (N3, {N4}). This adjacency indicates that node N1 is adjacent to N2, that N2 is adjacent to both of nodes N3 and N4, etc.

DiskANN is an on-disk index, e.g., as opposed to an in-memory index that is implemented entirely on RAM. On-disk may be better for large datasets, e.g., since it utilizes far less RAM. DiskANN is a graph-based Approximate Nearest Neighbor Search (ANNS) algorithm that builds a graph index and returns approximate nearest neighbors by searching the graph index. DiskANN can scale to large dataset, for example, by using a Product Quantization (PQ)-based hybrid method that stores a low-dimensional PQ index and graph (e.g., in memory) and the full vectors (the graph-node table) (e.g., on disk). In some examples, DiskAnn (e.g., DiskANN with PQ) may generate multiple tables, such as a pivot table to generate quantized vectors of vector1-vector4 in base table 400, edge table 600 indicating graph edges between source and destination vectors, and a PQ table indicating an identity key, a PQ embedding, etc. Edge table 600 may be used in requests that include a graph-based vector search of base table 400. Edge table 600 may be fully integrated with a database execution engine (e.g., execution engine 112) by virtue of the translated logical flow of query operators so that, for example, hybrid requests (e.g., a query with predicates on both vector and non-vector data) are translated to indicate the number of K vectors that resolve the request.

Referring again to FIG. 1, a request 110 may be a create vector index request. The type of index may be specified or may default to a type of index, such as an ANN index. Request 110 to create a vector index may create an ANN index on a specified table and vector column (e.g., a column in the specified table with a VECTOR data type). An index can be created before there is data in a table. In some examples, the syntax of a request to create vector index may be as follows:

CREATE VECTOR INDEX index_name
ON <object> (vector_column_name)
[WITH (
 [,] METRIC={'cosine'|'dot'|'euclidean'}
 [[,] TYPE=DiskANN})]
 . . .

METRIC may be used to indicate a distance metric to create the index.

TYPE may be used to indicate the type of ANN algorithm used to build the index, such as DiskANN, which may be a default value.

Although the example discusses DiskANN-PQ, the same principles described for various tables (e.g., including deref_table, meta_table, index_table) also disclose (e.g., with some adaptations) KNN-PQ, DiskANN, SP, SP-PQ, etc. Other vector indexes besides DiskANN may be implemented, such as hierarchical navigable small world (HNSW) and space partitioning (e.g., inverted file (IVF)). The creation of PQ vectors and space partitioning indexes may use an algorithm known as k-means, which can also be implemented using principles described herein. The structure of the internal tables for each type of vector index and the query plan may vary for each type of implementation.

An index build may include an initial index build statement (e.g., received from a user), which would be broken down into steps that are converted into query operators, then optimized and executed similar to the process for conversion of a vector search into a logical operator (LogOp) tree before optimization and execution. As another example, an index build/creation request comprising the following steps may be decomposed or translated into query operators:
1. Create a PQ vector pivot table for the vectors in the base table using k-means (e.g., a repeated series of vector averages) over the vectors in the base table or over a sample of the vectors in the base table using two query plans in a loop:
   a. Pick a set of initial "centroids" (e.g., vectors at the "center" of a partition);
   b. Assign each vector to a partition;
   c. Average the vectors in the partition to compute a new centroid; and
   d. Repeat steps b and c until the centroids converge (e.g., or other termination criteria);
2. Compute the PQ vectors for each vector in the base table (e.g., in a single query plan);
3. Find a medoid (a medoid vector computation) over the vectors in the base table or over a sample of the vectors in the base table to compute a best starting node with which to construct a graph;
4. Create an initial version of the graph by selecting a set of vectors (including designating the starting node), self-joining all vectors with all other vectors to create candidate edges, and pruning to reduce to the desired number of edges;

5. Selecting another set of vectors, search the existing graph to find candidate edges, pruning to reduce to the desired number of edges, and inserting new edges to the graph;
6. For each new edge from a new vector to an existing vector, insert an additional "backward" edge from the existing vector to the new vector; and
7. Periodically scan the graph for vectors with too many outbound edges (e.g., since backward edges accumulate), prune excess outbound edges, and update the graph accordingly.

Insert operations may be implemented as logical operators associated with steps 2-6. Deletes, although more complex, may also be implemented by translation into a series of query operator trees, ultimately executed as optimized query plans.

Requests 110 may be implemented almost entirely using RDB query operators (e.g., using operators that scan or seek (read) from tables, filter, join, union (concatenate) results, sort, etc.). One or more operators may be added for support, e.g., with optimizations by optimizer 108.

For example, a table valued function unpack_int may be created and implemented in support of converting vector-related requests into LogOp trees. Table valued function unpack_int may take a list of integers (e.g., stored as a single binary value) and turn it into multiple rows, which allows storage of the edges as (source_id, list of dest_ids) and conversion into (source_id, dest_id) for processing by other query operators. The edges could alternatively be stored as (source_id, dest_id) without the list.

For example, one or more aggregate function operators may be created and implemented in support of converting vector-related requests into LogOp trees. An aggregate function may take a set of rows and reduce them (e.g., to a single row). For example, a pack_int operator may take a set of integers and convert it into a single binary value, which may be the inverse of unpack_int. A prune operator may take a set of source and destination vector pairs and apply the DiskANN prune algorithm. One or more (e.g., two variations) vector_average operators may implement k-means, the PQ pivot table, and medoid computation.

Converter 114/314 may be configured to convert a create vector index request into a logical operator (LogOp) tree 118, which may be consistent with the operations described by the following pseudocode:

Create a new (empty) edge table; and
1. While more vectors remain do:
   a. While it's not yet time to run backward prune do:
      i. Select a next batch of vectors to insert into the index;
      ii. Generate a new set of pruned forward edges originating from that next batch of vectors; and
      iii. Insert temporary (not yet pruned) backward edges created by inverting the edges from the previous step; and
   b. Prune the set of vectors that includes any previously pruned edges and any accumulated backward edges.

In greater detail, converter 114/314 may be configured to convert a create vector index request into a logical operator (LogOp) tree 118 (e.g., with SQL operators associated with RDB 102) consistent with the operations described by following:

```
declare @R int = 64; --desired fanout
declare @maxR int = 0.3 * @R; --prune fanout threshold
declare @batchsize int = 320; --# of new vectors to process per loop iteration (e.g., a multiple of DOP)
declare @l int = @R;
declare @m int = (@l + 5) /6;
declare @algo varchar(16) = 'euclidean'; --this is the metric
declare @alpha real = 1;
--create graph edge table
create table graphedge (
   src_id int not null,
   pruned_dest_ids varbinary(8000) not null,
   new_dest_ids varbinary(8000) not null,
   dest_ids as pruned_dest_ids || new_dest_ids);
create unique clustered index i on graphedge(src_id);
--create temporary table for next batch of vectors
create table #queries (qid int primary key, qembedding vector(1536));
declare @id int = -1; --NOTE: LESS THAN MINIMUM id IN graphnode.
while more vectors remain
begin
   while not yet time to run backward prune AND more vectors remain
   begin
      --fetch next batch of queries
      truncate table #queries;
[1] insert into #queries select top (@batchsize) id, embedding from graphnode where id > @id order by id;
      --generate new forward edges (edges that originate at new vectors in the next batch)
[2] INSERT INTO graphedge (src_id, pruned_dest_ids, new_dest_ids)
      SELECT q1.qid as src_id, ann.pruned_dest_ids, 0x as new_dest_ids
      FROM #queries q1 CROSS APPLY (
         SELECT diskannprune(
            ann.dest_id, ann.dest_embedding, ann.distance
            , ann.src_id, ann.src_embedding
            , 'euclidean', @R, 1 /*new edge*/, @alpha)
            within group (order by ann.distance) as pruned_dest_ids
         from (
            select ann.id as dest_id, gn.embedding as dest_embedding
               , ann.distance
               , q1.qid as src_id, q1.qembedding as src_embedding
```

```
            FROM vector_search (
                table=graphnode gn, column=embedding, similar_to=q1.qembedding
                , metric = 'euclidean', FOR INDEX CREATE, L=@l, M=@m) AS ann
            union all
            select top (@R) q2.qid as dest_id, q2.qembedding as dest_embedding
                , VECTOR_DISTANCE(@algo, q1.qembedding, q2.qembedding) as distance
                , q1.qid as src_id, q1.qembedding as src_embedding
            from #queries q2
            where q1.qid <> q2.qid
            order by VECTOR_DISTANCE(@algo, q1.qembedding, q2.qembedding) asc
        ) ann
    ) ann;
    --insert backward edges
[3] update e
    set new_dest_ids ||= q.dest_ids
    from (
        select u.value as source_id, pack_int(t.source_id, null) as dest_ids
        from graphedge t cross apply unpack_int(t.dest_ids) u
        where t.source_id > @id and u.value < @id
        group by u.value
    ) q
    join graphedge e on q.source_id = e.source_id
    --determine the starting vector for the next batch
[4] set @id = (select max(qid) from #queries);
    end
    --prune nodes with excessive edges
    declare @maxlen int = case when @actualBS = @batchsize then @maxR * 4 else 0
end;
[5] update e
    set pruned_dest_ids = q.dest_ids, new_dest_ids = 0x
    from graphedge e join graphnode n1 on e.src_id = n1.id cross apply (
        select diskannprune(
                q.dest_id, q.dest_embedding, q.distance
                , q.src_id, q.src_embedding
                , 'euclidean', @R, q.new_edge, @alpha)
            within group (order by q.distance) as dest_ids
        from (
            select u.value as dest_id, n2.embedding as dest_embedding
                , VECTOR_DISTANCE(@algo, n1.embedding, n2.embedding, u.ordinal) as
distance
                , e.src_id, n1.embedding as src_embedding, 0 as new_edge
            from unpack_int(e.pruned_dest_ids, 1) u join graphnode n2 on u.value = n2.id
            union all
            select u.value as dest_id, n2.embedding as dest_embedding
                , VECTOR_DISTANCE(@algo, n1.embedding, n2.embedding) as distance
                , e.src_id, n1.embedding as src_embedding, 0 as old_edge
            from unpack_int(e.new_dest_ids) u join graphnode n2 on u.value = n2.id
        ) q
    ) q
    where DATALENGTH(e.new_dest_ids) > @maxlen
end
```

The foregoing example is implemented in SQL, which may be represented by logical plans and physical plans that may be optimized and executed by relational database system 102. In some examples, logical operator implementations are provided for diskannprune, pack_int, and unpack_ int in support of translating a request to create a vector index into a logical tree of query operators. For example, robust prune may be modeled with operators as a new type of aggregate function. Prune uses a new aggregate function rather than a new aggregate operator. Note that prune and pack may be implemented as aggregate functions. Unpack may be implemented as a table valued function (TVF). Both leverage (extend) existing operators.

The foregoing example of vector index creation highlights five parts, indicated as [1], [2], [3], [4], and [5], which are highlighted in the following portions of logical operator tree 118:

```
[1]
    LogOp_Insert (TBL: [#queries], 0)
        LogOp_Project
            LogOp_Top
                LogOp_Project
                    LogOp_Select
                        LogOp_Get TBL: graphnode graphnode
[2]
    LogOp_Insert (TBL: [graphedge], 1)
        LogOp_Project
            LogOp_Apply (x_jtInner)
                LogOp_Get TBL: #queries(alias TBL: q1)
                LogOp_Project
```

-continued

```
                    LogOp_GbAgg
                      LogOp_Project
                        LogOp_UnionAll
                          LogOp_Project
                            LogOp_Select
                              LogOp_LeftOuterJoin
                                LogOp_Project
                                  LogOp_Apply (x_jtInner)
                                    LogOp_Project
                                      LogOp_ConstTableGet (1) [empty]
                                    LogOp_ANN
                                      LogOp_Insert (TBL: [vector1_queue], 1)
                                        LogOp_Project
                                          LogOp_Get TBL: graphnode
                                      LogOp_Insert (TBL: [vector1_candidate], 1)
                                        LogOp_Project
                                          LogOp_Project
                                            LogOp_Project
                                              LogOp_Update (TBL: [vector1_queue], Idx 1)
                                                LogOp_Project
                                                  LogOp_GbTop
                                                    LogOp_Top
                                                      LogOp_Project
                                                        LogOp_Select
                                                          LogOp_Get TBL: vector1_queue
                                      LogOp_Insert (TBL: [vector1_queue2], 1)
                                        LogOp_Project
                                          LogOp_Get TBL: vector1_queue
                                      LogOp_Insert (TBL: [vector1_queue], 1)
                                        LogOp_Project
                                          LogOp_Top
                                            LogOp_GbAgg
                                              LogOp_Project
                                                LogOp_Project
                                                  LogOp_Join
                                                    LogOp_Project
                                                      LogOp_LeftAntiSemiJoin
                                                        LogOp_GbAgg
                                                          LogOp_Project
                                                            LogOp_Project
                                                              LogOp_Apply (x_jtInner)
                                                                LogOp_Join
                                                                  LogOp_Get TBL: vector1_candidate(alias TBL: c)
                                                                  LogOp_Project
                                                                    LogOp_Get TBL: graphedge
                                                                LogOp_StreamingTab
                                                                Udf RESULT(QCOL:
                                                                UNPACK_INT.value)
                                                              LogOp_Get TBL: vector1_queue2(alias TBL: q)
                                                        LogOp_Get TBL: graphnode
                                              LogOp_Top NoTies
                                                LogOp_Project QCOL: [vector1_queue].iteration
                                                  LogOp_Select
                                                    LogOp_Top
                                                      LogOp_Project
                                                        LogOp_Get TBL: vector1_queue
                                                  LogOp_Project
                                                    LogOp_Select
                                                      LogOp_Get TBL: vector1_queue
                                    LogOp_Get TBL: graphnode
                              LogOp_Top
                                LogOp_Project
                                  LogOp_Select
                                    LogOp_Get TBL: #queries(alias TBL: q2)
[3]
  LogOp_Update (TBL: [graphedge], Idx 1)
    LogOp_Project
      LogOp_GbTop
        LogOp_Join
          LogOp_Project
            LogOp_GbAgg
              LogOp_Project
                LogOp_Select
```

-continued

```
                LogOp_Apply (x_jtInner)
                    LogOp_Project
                        LogOp_Get TBL: graphedge(alias TBL: t)
                        LogOp_StreamingTabUdf RESULT(QCOL:
UNPACK_INT.value)
            LogOp_Project
                LogOp_Get TBL: graphedge(alias TBL: e)
[4]
    LogOp_Project
        LogOp_ConstTableGet (1) [empty]
            ScaOp_Subquery
                LogOp_Project
                    LogOp_GbAgg
                        LogOp_Get TBL: #queries
[5]
    LogOp_Update (TBL: [graphedge], Idx 1)
        LogOp_Project
            LogOp_Gb Top
                LogOp_Select
                    LogOp_Apply (x_jtInner)
                        LogOp_Join
                            LogOp_Project
                                LogOp_Get TBL: graphedge(alias TBL: e)
                                LogOp_Get TBL: graphnode(alias TBL: n1)
                            LogOp_Project
                                LogOp_GbAgg
                                    LogOp_Project
                                        LogOp_UnionAll
                                            LogOp_Project
                                                LogOp_Join
                                                    LogOp_Streaming TabUdf RESULT(QCOL:
UNPACK INT.value QCOL: UNPACK INT.ordinal)
                                                    LogOp_Get TBL: graphnode(alias TBL: n2)
                                            LogOp_Project
                                                LogOp_Join
                                                    LogOp_Streaming TabUdf RESULT(QCOL:
UNPACK INT.value)
                                                    LogOp_Get TBL: graphnode(alias TBL: n2)
```

The summarization of portions [1]-[5] provided further above applies to these example portions [1]-[5] shown immediately above.

One or more internal functions may be implemented for support, for example, to compute distance when working with PQ vectors instead of original vectors (e.g., vector embeddings). The functions may be called in the same or similar way as other SQL built-in functions.

Referring again to FIG. 1, a request 110 may be a vector search request. A vector search may be a table-valued function that performs a search on vectors, e.g., using an ANN index. Usage of an ANN may be indicated/decided at runtime, for example, based on how many vectors are estimated to be used in the search process. For small numbers of vectors (<1000), KNN may be a default, but a request may force ANN usage. In some examples, the syntax of a request to perform a vector search may be as follows:

VECTOR_SEARCH(
  TABLE <<object> [as <source table alias>],
  COLUMN=<column>,
  SIMILAR_TO=<query vector>,
  METRIC=<metric>
  [[,] TOP_N=<k>]
) [WITH ([FORCE_ANN_ONLY])] as <result table alias>

TABLE argument <object> as <source table alias> may indicate the table on which to perform the vector search.

COLUMN argument <column> may indicate the vector column in which the vector search is performed, e.g., a column with a vector type.

SIMILAR_TO argument <query vector> may indicate the vector used for search, e.g., an expression that evaluates to a vector type.

METRIC argument <metric> may indicate the distance metric used to calculate distance between the query vector and the vectors in the specified column. The argument may be a string allowing values, such as dot, Euclidean, or cosine. An index (e.g., ANN index) may be used, for example, if the same metric used to create the index is indicated as the distance metric. A validation warning or error may be indicated if there are no compatible indexes using the indicated metric. A KNN approach may be used, for example, if there are no compatible indexes.

TOP_N argument <k> may indicate the maximum number of most similar vectors that should be returned in result 124.

The argument <result table alias> may indicate the alias to be used to reference the resulting result set in result 124.

FORCE_ANN_ONLY may be used to force the search function to use an ANN index, e.g., even if the number of vectors to search from is very small.

Validator 332 may indicate one or more errors. An example of an error is different dimensionality, indicating that the query vector and the vector column do not have the same dimensionality and/or do not have the same underlying base type. An example of an error is Same Alias, indicating that <source table alias> and <target table alias> are the same.

A result (e.g., result 124) of a vector search may be, for example, a rowset with all the columns from <object> with a Distance column that indicates the distance from the query vector.

For example, a user may input the following search vector request 110 or the request 110 may be accessed from a table in database(s) 116:
    DECLARE @query_embedding vector(1536)= . . . ;
    SELECT . . .
    FROM vector_search (
    table=graphnode as gn
    , column=embedding
    , similar_to=@query_embedding
    , metric='euclidean'
    , top_n=10) AS ann;

The search/query vectors may come from anywhere. For example, the search/query vectors may be stored in a table in database(s) 116 (not shown), in which case the syntax of the vector search request may be as follows:
    SELECT . . .
    FROM VectorQueries q
    CROSS APPLY vector_search (
        table=graphnode as gn
        , column=embedding
        , similar_to=q.query_embedding
        , metric='euclidean'
        , top_n=10) AS ann;

Converter 114/314 may be configured to convert the search vector request into a logical operator (LogOp) tree 118 consistent with, for example, the following pseudocode for an ANN search:
  1. A priority queue of vectors sorted by their distance from the query vector is initialized with the starting node and its distance. The maximum size of the queue is L entries. More distant entries are automatically removed from the queue;
  2. The next set of candidates that have not been explored yet is picked from the queue;
  3. Nodes connecting from the candidates are inserted into the queue with their respective distances to the query vector; and
  4. The queue is checked whether the entries have all been explored already. If so, the algorithm ends and returns the first (TOP) K entries. If there are unexplored entries, the algorithm goes to step 2, picks the next set of candidates to explore, and iterates.

Converter 314 may be configured to convert requests 110 into logical operator tree 118 as a multi-step query. Multi-step queries can repeatedly run individual children of a sequence operator and make decisions between the runs which child to run next. For example, an ANN algorithm can be implemented as a sequence of steps and store intermediate results ("queue" and "candidates") in worktables.

The steps (subqueries) may be created in an Algebrizer (e.g., implemented in converter 314) and added as children to a sequence operator. A multi-step query may be implemented with concurrent serial zones. ANN-related requests may not be expected to handle many rows per iteration, but could benefit from correlated parameters. Multiple query vectors could run in parallel to improve overall query performance, e.g., for index build, where ANN-related requests may be run repeatedly to find the new vectors' place in the graph. A multi-step design may allow execution of the steps "inline," for example, when the Sequence operator is opened, e.g., instead of at query startup.

Worktables may be used to store intermediate results between steps. Worktables may or may not be shared across different requests (e.g., queries). Worktables may include clustered indexes. The worktables may be configured to support updates, e.g., via a clustering key for QP. The key may be the same key as for the base table(s) 126, given that the information may be carried to properly lookup the connecting edges and to join with the base table(s) 126 to extract additional columns. Support for key columns may be provided in worktable metadata classes.

Worktables may be parallel worktables. Graph worktables may be created at query startup. Threads (e.g., all threads) may operate on the same shared worktables. For concurrent serial zones, each thread may operate on its own worktables (e.g., without sharing across threads). Worktable creation may be implemented in the query execution context. Worktables may be created as per-thread worktables, for example, when the ANN query is running in a concurrent serial zone.

Cardinality hints may be provided on worktables. An ANN query sequence may be created in an Algebrizer (e.g., implemented in converter 314). The query optimizer 108 determines the best query plan 120 based on the logical operator tree 118. Query optimizer 108 may be provided with (e.g., accurate) cardinality estimates of the tables involved in the query. Worktable metadata created for ANN queries may include support for cardinality hints to aid the optimizer 108 in optimizing a query plan.

Parser 330 may be configured, for example, based on expected syntax. For example, a VECTOR_SEARCH request may include the keyword TABLE after the parenthesis, which may be used to distinguish a request from other requests or information. Parser 330 may, for example, create a CRelOp_Sequence operator with its children being the parameters (e.g., query vector, k, table and column name, etc.). A flag may be added to the Sequence operator to indicate an ANN sequence.

Converter 314 (e.g., via an Algebrizer) may implement a bind for the CRelOp_Sequence and assert it as called for ANN sequences. Multiple (e.g., two) passes may be made over the ANN sequence, e.g., first creating the desired RelOp tree, then binding it.

In the first pass, the parameters may be extracted from the original sequence (passed by the parser 330), and the table and column names may be looked up in metadata to extract additional information, e.g. the names of the internal edge tables, PQ bins, primary key information, the starting node, etc. Based on information obtained during the first pass, metadata and CTableMetadata may be created for internal worktables. Unique names may be created for the worktables. A counter may be maintained on a query to provide a unique prefix for the worktables, e.g. "ann_search$n," where $n is a unique number. Based on information obtained during the first pass, the subqueries may be constructed (e.g., as RelOp trees) for each of the steps outlined above and new children may be created for the sequence (e.g., as shown by example in FIGS. 6A and 6B). If an inner and outer alias was provided, an outer join may be added with the base table so that additional columns can be projected out. Optimizer 108 may remove an outer join, for example, if no columns are projected later. An aggregate may be added to calculate the rank of each of the result rows.

In the second binding pass (e.g., after creating the new subtree), Bind may be called on the new root, which may recursively bind the subtree. Bind may be called on the sequence a second time, for example, by recursively calling Bind on the sequence's children, which may resolve (e.g., all) column references and ensure the supplied parameters are valid (e.g., the operations of validator 332 may overlap with the operations of converter 314).

Converter 114/314 may be configured to convert the search vector request into the following logical operator (LogOp) tree 118, which has been simplified by removing scalar operations:

```
LogOp_Project
  LogOp_LeftOuterJoin
    LogOp_Project
      LogOp_Apply (x_jtInner)
        LogOp_Project
          LogOp_ConstTableGet (1) [empty]
        LogOp_ANN
          LogOp_Insert (TBL: [vector1_queue], 1)
            LogOp_Project
              LogOp_Select
                LogOp_Get TBL: graphnode
          LogOp_Insert (TBL: [vector1_candidate], 1)
            LogOp_Project
              LogOp_Project
                LogOp_Project
                  LogOp_Update (TBL: [vector1_queue], Idx 1)
                    LogOp_Project
                      LogOp_GbTop Group
                        LogOp_Top
                          LogOp_Project
                            LogOp_Select
                              LogOp_Get TBL: vector1_queue vector1_queue
          LogOp_Insert (TBL: [vector1_queue2], 1)
            LogOp_Project
              LogOp_Get TBL: vector1_queue
          LogOp_Insert (TBL: [vector1_queue], 1)
            LogOp_Project
              LogOp_Top
                LogOp_GbAgg
                  LogOp_Project
                    LogOp_Project
                      LogOp_Join
                        LogOp_Project
                          LogOp_LeftAntiSemiJoin
                            LogOp_GbAgg
                              LogOp_Project
                                LogOp_Project
                                  LogOp_Apply (x_jtInner)
                                    LogOp_Join
                                      LogOp_Get TBL: vector1 candidate
                                      LogOp_Project
                                        LogOp_Get TBL: graphedge_packed
                            LogOp_Get TBL: vector1_queue2(alias TBL: q)
                        LogOp_Get TBL: graphnode
          LogOp_Delete TBL: [vector1_queue], 1
            LogOp_GbTop
              LogOp_Top
                LogOp_Project
                  LogOp_Get TBL: vector1_queue
      LogOp_Top NoTies
        LogOp_Project
          LogOp_Select
            LogOp_Top
              LogOp_Project
                LogOp_Get TBL: vector1_queue
    LogOp_Top
      LogOp_Project
        LogOp_Get TBL: vector1_queue
  LogOp_Get TBL: graphnode
```

The above example logical operator tree is textually summarized according to the following operations: Insert the graph start node and the distance from the query vector to the start vector into an initially empty queue. Select the M candidate nodes from the queue with the lowest distances (nearest to the query vector). Expand each candidate node by retrieving from the graph edge table the set of destination nodes of edges originating from that node, eliminating any destination nodes already in the queue, and inserting the L destination nodes (vectors) nearest by distance to the query vector into the queue. Maintain the queue at a maximum length of L nodes. Repeat with the next M candidate nodes until there are no unexpanded nodes remaining in the queue. Once the loop terminates, return the K nodes in the queue with the lowest distances (nearest to the query vector) and retrieve any other required columns from the base table (graphnode).

The above example logical operator tree may be alternately summarized according to the following pseudocode:
1. Insert the graph start node and the distance from the query vector to the start vector into an initially empty queue.
2. Loop until there are no unexpanded nodes remaining in the queue:
   2a. Select the M candidate nodes from the queue with the lowest distances (nearest to the query vector).
   2b. Expand each candidate node by retrieving from the graph edge table the set of destination nodes of edges originating from that node, eliminating any destination nodes already in the queue, and inserting the L destination nodes (vectors) nearest by distance to the query vector into the queue.
   2c. Maintain the queue at a maximum length of L nodes.

3. Return the K nodes in the queue with the lowest distances (nearest to the query vector) and retrieve any other required columns from the base table (graphnode).

Figure 7A:
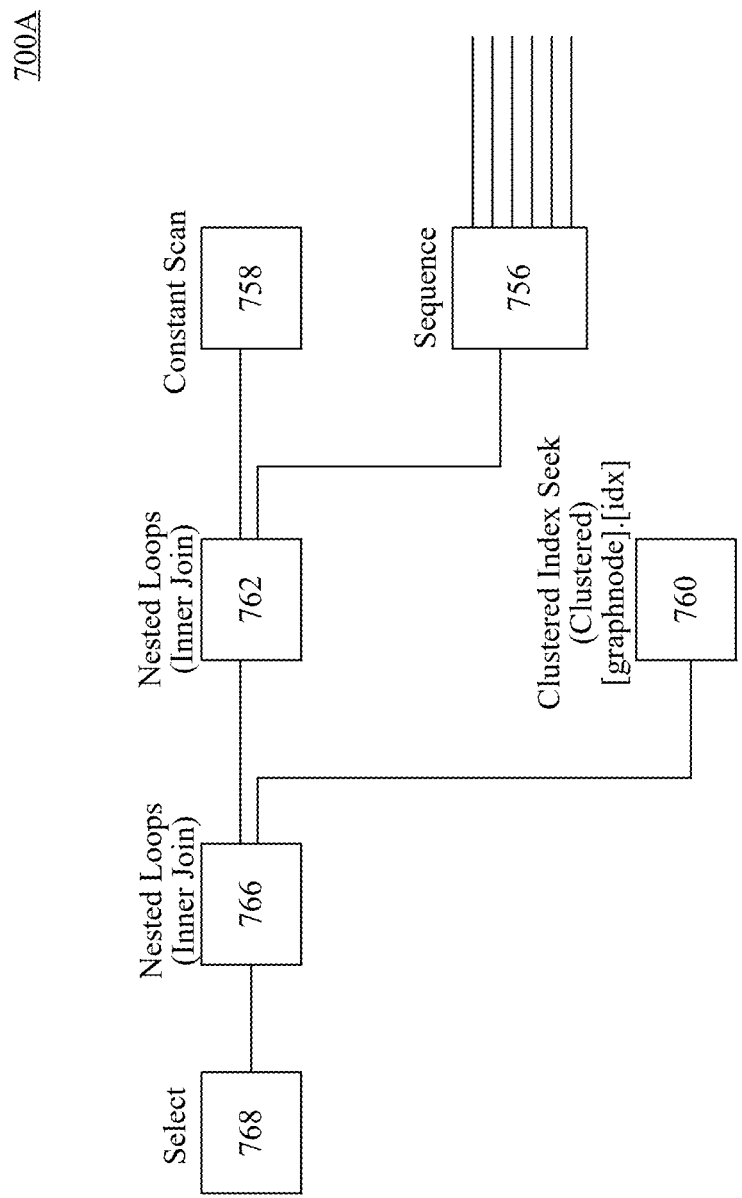
FIGS. 7A and 7B show graphical tree examples of logical operator trees, according to example embodiments.
Figure 7B:
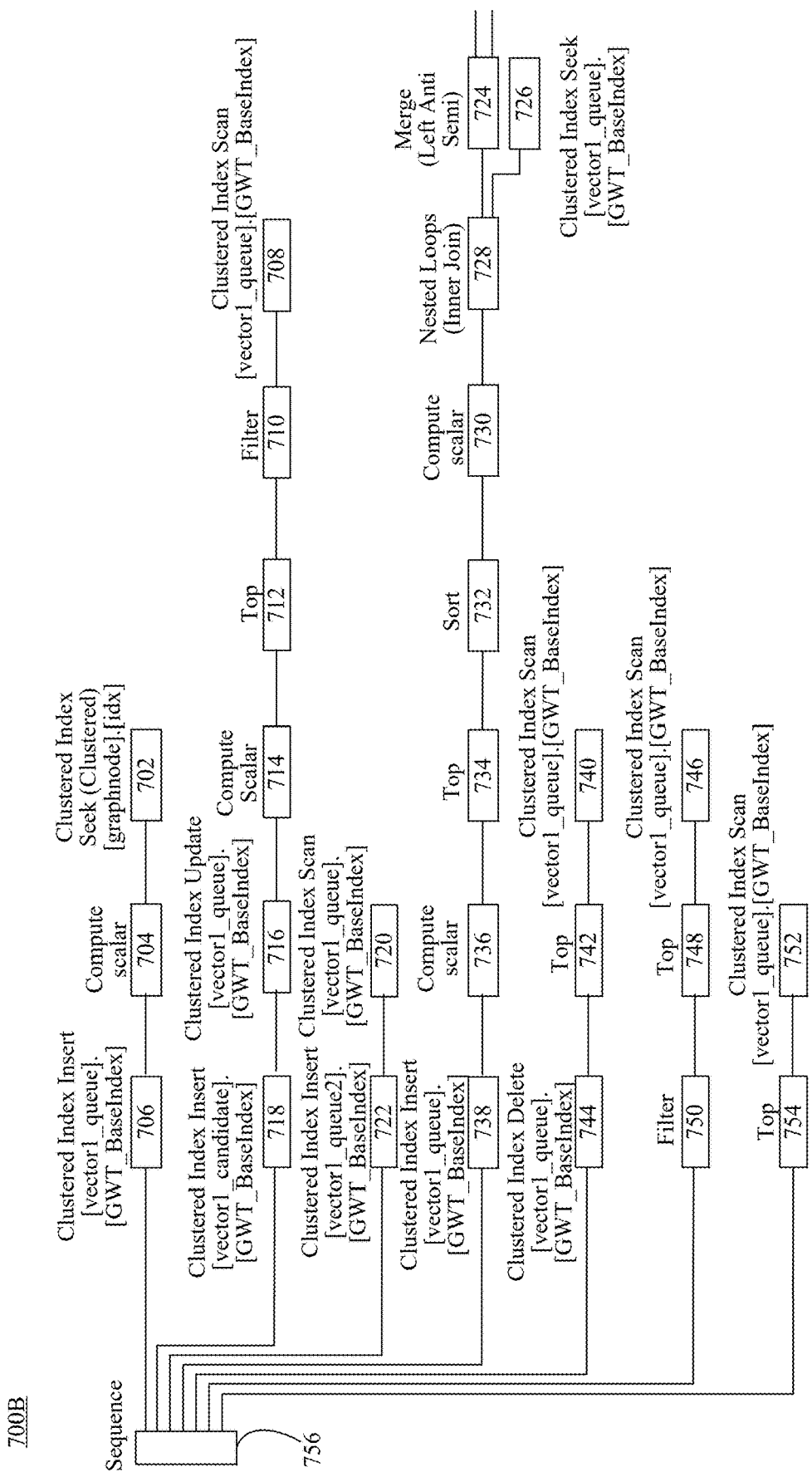

The logical operator tree 118 may be represented as a graphical logical operator tree, for example, as shown in FIGS. 7A and 7B.

FIGS. 7A and 7B show graphical tree examples of a logical operator tree, according to example embodiments. In particular, operators 756, 758, 760, 762, 766, and 768 of FIG. 7A represent a first logical operator tree 700A. Operators 702-756 of FIG. 7B represent a second logical operator tree 700B. Generally, operators 702-756 are shown as simplified versions of logical operators in logical operator tree 118. FIG. 7A shows first logical operator tree 700A with an outer reference operator and join with base table(s) 126. Second logical operator tree 700B of FIG. 7B show a more detailed example of an ANN sequence and its children. Note that second logical operator tree 700B may also be considered incomplete. For instance, second logical operator tree 700B may be further extended, such as from operator 724 (as indicated by the two lines extending right from operator 724 in FIG. 7B), and in such case may be considered truncated for reasons of brevity. FIG. 7A shows a top part of the created sequence. The constant scan logical operator on the outer side operates to calculate the provided parameters, e.g. K, and pass them to the sequence as outer references to avoid calculating a complex expression every time the value of K is accessed inside the sequence. The join on top of the sequence operates to pull in additional columns from the base table.

Optimizer 112 may be configured to turn the logical operator tree 118 into an optimized query plan (e.g., physical operator tree) 120 as follows, edited for simplification:

```
|--Nested Loops(Left Outer Join)
   |--Nested Loops(Inner Join)
   |  |--Constant Scan
   |  |--Sequence
   |     |--Clustered Index Insert(OBJECT:(vector1_queue AS [q]), SET:([id] =
[graphnode].[id], [distance] = [Expr1007], [iteration] = [Expr1008]))
   |     |  |--Compute
Scalar(DEFINE:([Expr1007]=vector_distance(N'euclidean',[graphnode].[embedding],[@
query_embedding]), [Expr1008]=(1)))
   |     |  |  |--Clustered Index Seek(OBJECT:([graphnode]), SEEK:([id]=(0)))
   |     |  |--Clustered Index Insert(OBJECT:(vector1_candidate),
SET:([vector1_candidate].[id] = [vector1_queue].[id]))
   |     |  |  |--Clustered Index Update(OBJECT:(vector1_queue), SET:([iteration] =
[Expr1014]))
   |     |  |     |--Compute Scalar(DEFINE:([Expr1014]=(0)))
   |     |  |        |--Top(TOP EXPRESSION:([Expr1002]))
   |     |  |           |--Filter(WHERE:([vector1_queue].[iteration]>(0)))
   |     |  |              |--Clustered Index Scan(OBJECT:(vector1_queue))
   |     |  |--Clustered Index Insert(OBJECT:(vector1_queue2), SET:([id] =
[vector1_queue].[id], [distance] = [vector1_queue].[distance], [iteration] =
[vector1_queue].[iteration]))
   |     |  |  |--Clustered Index Scan(OBJECT:(vector1_queue))
   |     |  |--Clustered Index Insert(OBJECT:(vector1_queue), SET:([id] =
[graphnode].[id], [distance] = [Expr1032], [iteration] = [Expr1034]))
   |     |  |  |--Compute Scalar(DEFINE:([Expr1034]=(1)))
   |     |  |     |--Top(TOP EXPRESSION:([Expr1001]))
   |     |  |        |--Sort(ORDER BY:([Expr1032] ASC))
   |     |  |           |--Compute
Scalar(DEFINE:([Expr1032]=vector_distance(N'euclidean',[graphnode].[embedding],[@
qembedding])))
   |     |  |              |--Nested Loops(Inner Join)
   |     |  |                 |--Merge Join(Left Anti Semi Join,
MERGE:(UNPACK_INT.[value])=([q].[id]))
   |     |  |                 |  |--Sort(DISTINCT ORDER BY:(UNPACK_INT.[value]
ASC))
   |     |  |                 |  |  |--Nested Loops(Inner Join)
   |     |  |                 |  |     |--Nested Loops(Inner Join)
   |     |  |                 |  |     |  |--Compute
Scalar(DEFINE:([graphedge_packed].[dest_ids]=[graphedge_packed].[pruned_dest_ids]||
[graphedge_packed].[new_dest_ids]))
   |     |  |                 |  |     |  |  |--Clustered Index
Scan(OBJECT:([graphedge_packed]))
   |     |  |                 |  |     |  |--Clustered Index
Seek(OBJECT:(vector1_candidate AS [c]), SEEK:([id]=[graphedge_packed].[src_id]))
   |     |  |                 |  |     |--Table-valued function
   |     |  |                 |  |        |--Clustered Index Scan(OBJECT:(vector1_queue2 AS
[q]))
   |     |  |                 |  |--Clustered Index Seek(OBJECT:([graphnode]),
SEEK:([id]=UNPACK_INT.[value]))
   |     |--Clustered Index Delete(OBJECT:(vector1_queue))
   |     |  |--Top(OFFSET EXPRESSION:([Expr1001]), TOP
EXPRESSION:((9223372036854775807)))
   |     |     |--Clustered Index Scan(OBJECT:(vector1_queue))
   |     |--Top(TOP EXPRESSION:((1))
   |        |--Filter(WHERE:([vector1_queue].[iteration]=(1))
   |           |--Top(TOP EXPRESSION:([Expr1001]))
   |              |--Clustered Index Scan(OBJECT:(vector1_queue))
```

```
|    |--Top(TOP EXPRESSION:([Expr1000]))
|    |    |--Clustered Index Scan(OBJECT:(vector1_queue))
|--Clustered Index Seek(OBJECT:([graphnode]), SEEK:([id]=[vector1_queue].[id]))
```

The summarizations (textual and pseudocode) of the example logical operator tree (LogOp) provided further above apply to the example logical operator tree shown immediately above.

A multi-step sequence is a type of logical and physical sequence operator that may be included in a query plan. A multi-step sequence may include, for example, an initial step, an intermediate step, and a final step. Although multi-step sequence may have three steps in some implementations, in other embodiments of a multi-step sequence may include fewer steps or a greater number of steps. Moreover, a multi-step sequence may include more than one final step, with the particular final step to execute being left as a runtime decision. Note that a multi-step sequence may also be a single step that is repeated one or more times.

In embodiments, a multi-step sequence may be understood by regarding instances of multi-step sequence as an ordinary sequence operator, but with relaxed execution constraints and expanded inter-step communication capabilities. An ordinary sequence operator typically drives wide update plans and executes each child of the sequence in a purely sequential order, first to last. Each child of such a sequence typically updates a different object and returns only those rows generated by the last child of the sequence.

A multi-step sequence, on the other hand, is a more flexible sequence operator with a number of different capabilities. For example, embodiments of a multi-step sequence, when included in a logical or executable physical query plan, may enable one or more of the following capabilities depending on the particulars of the generated multi-step sequence:

- sub-division of a query plan into separate steps that may be executed in an arbitrary order, and may be repeated to permit flexible, performant recursive execution;
- communication of arbitrary data including full or partial result sets between steps;
- multiple alternative plans for one or more steps, with execution choice between plans deferred until execution (e.g., serial plan vs parallel plan depending on cardinality determined during execution);
- adaptation between steps including: parallelism, adaptive memory grants to account for over or underestimation of memory needs, cardinality estimates; and
- applicability to a number of applications including: interleaved execution, parameter sensitive plans, and/or bidirectional execution of a graph shortest path query.

In some embodiments, an initial step, an intermediate step, and a final step of a multi-step sequence may each comprise a single physical or logical SQL query operator. In other embodiments, however, steps of multi-step sequence may comprise one or more physical or logical SQL query operators. In an embodiment, physical operators may include any type of physical operator, such as for example, hash match, table insert, merge join, nested loops, index insert, non-clustered index update, parallelism, sort, split, stream aggregate, table scan and other types of SQL physical operators as may be known in the art. In embodiments, logical query operators may include, for example, branch and segment repartition, various join operators, indistinct and distinct sort, partial aggregate, union and other types of SQL logical operators as known in the art.

Figure 8:
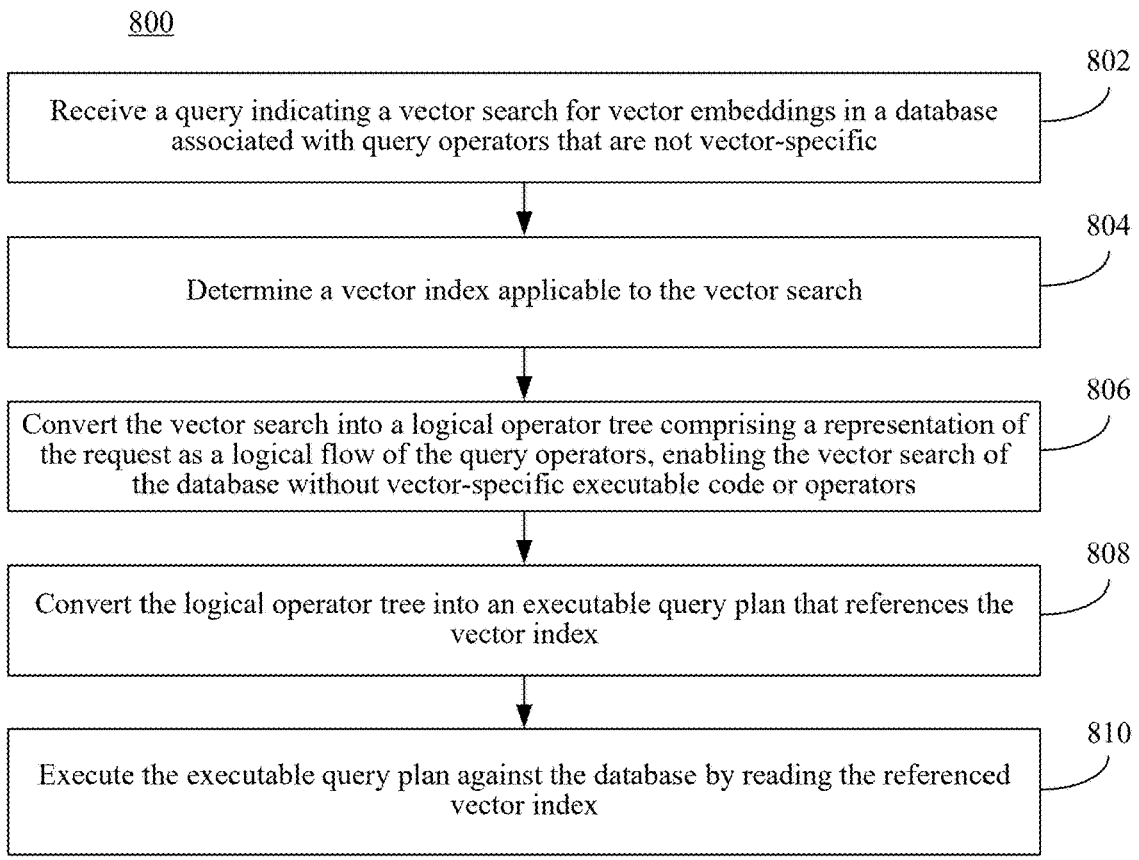
FIG. 8 shows a flowchart of a method for translating vector-related requests into one or more logical query trees, according to an example embodiment.

In embodiments, relational database system 102 of FIG. 1 may be used in various ways to translate vector-related requests into one or more logical query trees of query operators. For instance, FIG. 8 shows a flowchart 800 of a method for translating vector-related requests, such as a vector search request, into one or more logical query trees, according to an example embodiment of relational database system 102 with converter 114/314. Flowchart 800 is described with continued reference to FIGS. 1 and 2. However, other structural and operational embodiments will be apparent to persons skilled in the relevant art(s) based on the following discussion regarding flowchart 800 and relational database system 102 with converter 114/314.

Flowchart 800 begins with step 802. In step 802, a query is received. The query indicates a vector search for vector embeddings in a database associated with query operators that are non-vector-specific. For example, as shown in FIGS. 1 and 2, pre-processor 106/306 receives request 110/310 from request source 104.

In step 804, a vector index applicable to the vector search is determined. For example, as shown in FIGS. 1 and 2, pre-processor 106/306 (e.g., via parser 330 and validator 332) determine vector index(es) 128 applicable to the vector search portion of request 110/310.

In step 806, the vector search is converted into a logical operator tree comprising a representation of the request as a logical flow of the query operators, enabling the vector search of the database without vector-specific executable code or operators. For example, as shown in FIGS. 1 and 2, pre-processor 106/306 (e.g., via converter 114/314) converts the vector search portion of request 110/310 into logical operator tree 118/318, as shown by further example logical operator tree 700A in FIG. 7A and example logical operator tree 700B in FIG. 7B.

In step 808, the logical operator tree is converted into an executable query plan that references the vector index. For example, as shown in FIG. 1, optimizer 108 converts logical operator tree 118/318 into executable query plan 120 that references vector index(es) 128.

In step 810, the executable query plan is executed against the database by reading the referenced vector index. For example, as shown in FIG. 1, execution engine 112 executes executable query plan 120 against database(s) 116 by reading vector index(es) 128.

Figure 9:
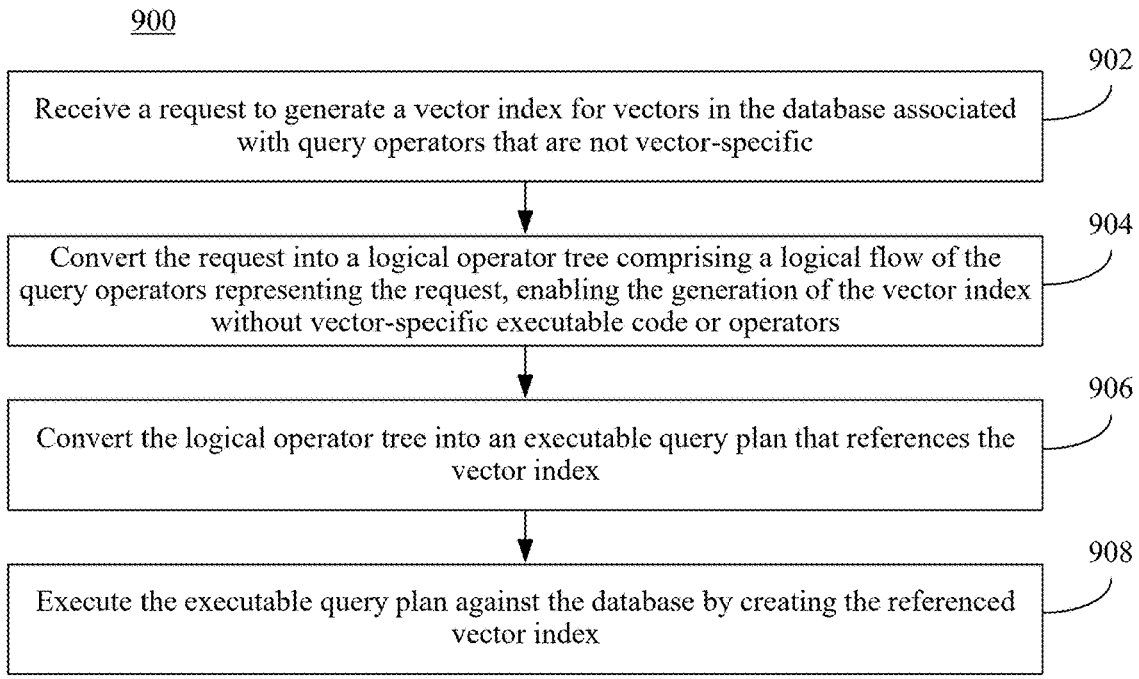
FIG. 9 shows a flowchart of a method for translating vector-related requests into one or more logical query trees, according to an example embodiment.

In embodiments, relational database system 102 of FIG. 1 may be used in various ways to translate vector-related requests, such as a vector index creation request, into one or more logical query trees of query operators. For instance, FIG. 9 shows a flowchart 900 of a method for translating vector-related requests into one or more logical query trees, according to an example embodiment of relational database system 102 with converter 114/314. Flowchart 900 is described with continued reference to FIGS. 1 and 2. However, other structural and operational embodiments will be apparent to persons skilled in the relevant art(s) based on the following discussion regarding flowchart 900 and relational database system 102 with converter 114/314.

Flowchart 900 begins with step 902. In step 902, a request is received. The request comprises a request to generate a vector index for vectors in the database associated with query operators that are non-vector-specific. For example, as shown in FIGS. 1 and 2, pre-processor 106/306 receives request 110/310 from request source 104.

In step 904, the request is converted into a logical operator tree comprising a logical flow of the query operators representing the request, enabling the generation of the vector index without vector-specific executable code or operators. For example, as shown in FIGS. 1 and 2, pre-processor 106/306 (e.g., via converter 114/314) converts the vector index generation request 110/310 into logical operator tree 118/318.

In step 906, converting the logical operator tree into an executable query plan that references the vector index. For example, as shown in FIG. 1, optimizer 108 converts logical operator tree 118/318 into executable query plan 120 that references vector index(es) 128.

In step 908, executing the executable query plan against the database by creating the referenced vector index. For example, as shown in FIG. 1, execution engine 112 executes executable query plan 120 against database(s) 116 by reading vector index(es) 128.

Note that foregoing general description of the operation of relational database system 102 is provided for example, and embodiments of relational database system 102 may operate in manners different than described above. Furthermore, not all steps of flowcharts 800 and 900 of FIGS. 8 and 9 need to be performed in all embodiments. Furthermore, the steps of flowcharts 800 and 900 may be performed in orders different than shown in some embodiments.

III. Example Computing Device Embodiments

Relational database system 102, request source 104, pre-processor 106/306, optimizer 108, execution engine 112, converter 114/314, parser 330, validator 332, operators 702-768, and flowcharts 800 and 900, or components or modules thereof, are each implemented as computer program code/instructions configured to be executed in one or more processors and stored in a computer readable storage medium. Alternatively, relational database system 102, request source 104, pre-processor 106/306, optimizer 108, execution engine 112, converter 114/314, parser 330, validator 332, operators 702-768, and flowcharts 800 and 900, or components or modules thereof, are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 10:
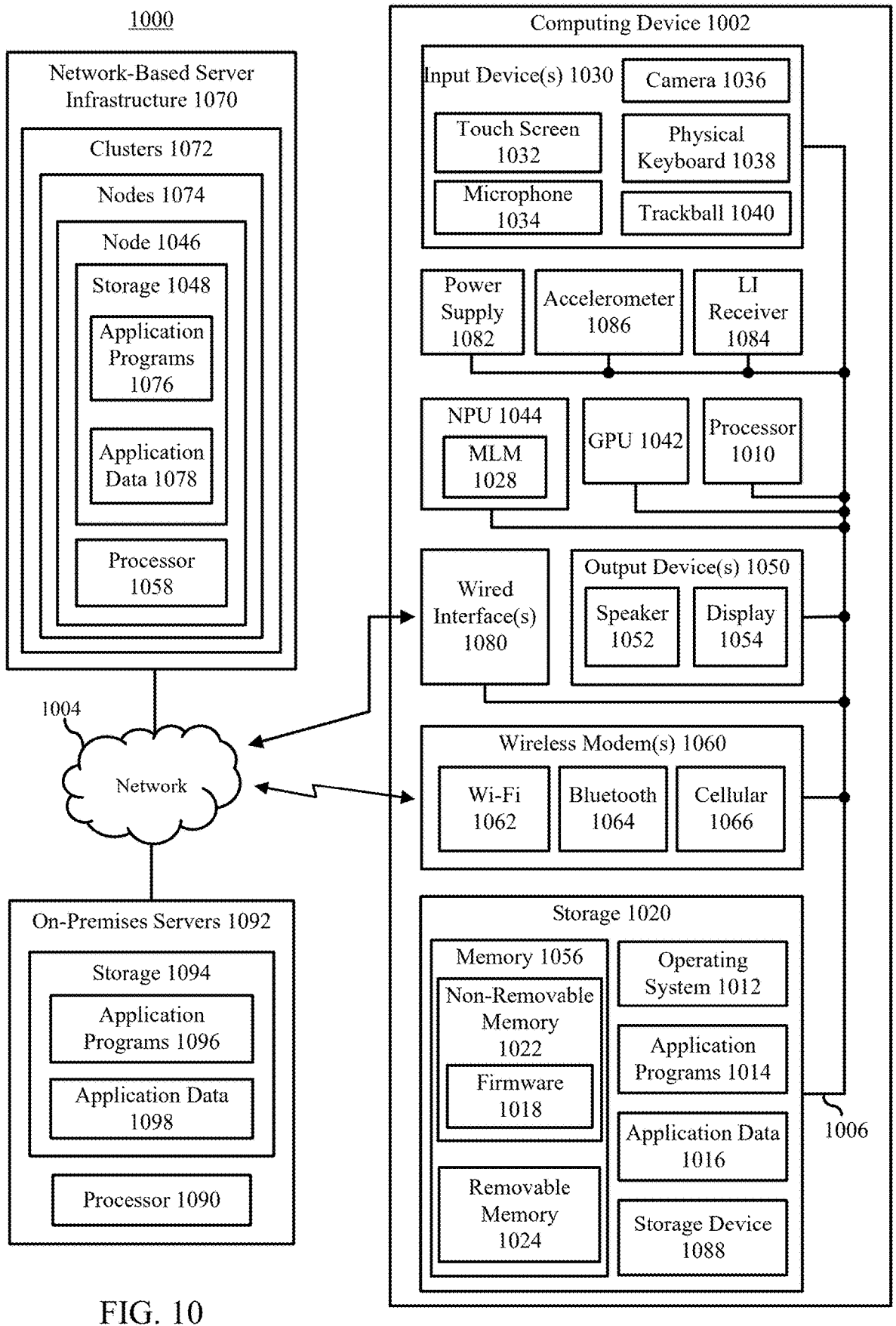
FIG. 10 shows a block diagram of an exemplary computing environment that includes a computing device that may be used to implement various embodiments.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 10. FIG. 10 shows a block diagram of an exemplary computing environment 1000 that includes a computing device 1002. Computing device 1002 is an example of one or more devices that may embody one or both of relational database system 102 and request source 104, which may each include one or more of the components of computing device 1002. In some embodiments, computing device 1002 is communicatively coupled with devices (not shown in FIG. 10) external to computing environment 1000 via network 1004. Network 1004 comprises one or more networks such as local area networks (LANs), wide area networks (WANs), enterprise networks, the Internet, etc. In examples, network 1004 includes one or more wired and/or wireless portions. In some examples, network 1004 additionally or alternatively includes a cellular network for cellular communications. Computing device 1002 is described in detail as follows.

Computing device 1002 is any of a variety of types of computing devices. Examples of computing device 1002 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1002 is a stationary computing device such as a desktop computer, a personal computer (PC), a stationary server device, a minicomputer, a mainframe, a supercomputer, etc.

As shown in FIG. 10, computing device 1002 includes a variety of hardware and software components, including a processor 1010, a storage 1020, a graphics processing unit (GPU) 1042, a neural processing unit (NPU) 1044, one or more input devices 1030, one or more output devices 1050, one or more wireless modems 1060, one or more wired interfaces 1080, a power supply 1082, a location information (LI) receiver 1084, and an accelerometer 1086. Storage 1020 includes memory 1056, which includes non-removable memory 1022 and removable memory 1024, and a storage device 1088. Storage 1020 also stores an operating system 1012, application programs 1014, and application data 1016. Wireless modem(s) 1060 include a Wi-Fi modem 1062, a Bluetooth modem 1064, and a cellular modem 1066. Output device(s) 1050 includes a speaker 1052 and a display 1054. Input device(s) 1030 includes a touch screen 1032, a microphone 1034, a camera 1036, a physical keyboard 1038, and a trackball 1040. Not all components of computing device 1002 shown in FIG. 10 are present in all embodiments, additional components not shown may be present, and in a particular embodiment any combination of the components are present. In examples, components of computing device 1002 are mounted to a circuit card (e.g., a motherboard) of computing device 1002, integrated in a housing of computing device 1002, or otherwise included in computing device 1002. The components of computing device 1002 are described as follows.

In embodiments, a single processor 1010 (e.g., central processing unit (CPU), microcontroller, a microprocessor, signal processor, ASIC (application specific integrated circuit), and/or other physical hardware processor circuit) or multiple processors 1010 are present in computing device 1002 for performing such tasks as program execution, signal coding, data processing, input/output processing, power control, and/or other functions. In examples, processor 1010 is a single-core or multi-core processor, and each processor core is single-threaded or multithreaded (to provide multiple threads of execution concurrently). Processor 1010 is configured to execute program code stored in a computer readable medium, such as program code of operating system 1012 and application programs 1014 stored in storage 1020. The program code is structured to cause processor 1010 to perform operations, including the processes/methods disclosed herein. Operating system 1012 controls the allocation and usage of the components of computing device 1002 and provides support for one or more application programs 1014 (also referred to as "applications" or "apps"). In examples, application programs 1014 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1010 includes one or more general processors (e.g., CPUs) configured with or coupled to one or more hardware accelerators, such as one or more NPUs 1044 and/or one or more GPUs 1042.

Any component in computing device 1002 can communicate with any other component according to function, although not all connections are shown for ease of illustration. For instance, as shown in FIG. 10, bus 1006 is a multiple signal line communication medium (e.g., conductive traces in silicon, metal traces along a motherboard, wires, etc.) present to communicatively couple processor 1010 to various other components of computing device 1002, although in other embodiments, an alternative bus, further buses, and/or one or more individual signal lines is/are present to communicatively couple components. Bus 1006 represents one or more of any of several types of bus structures, including a memory bus or memory controller, a peripheral bus, an accelerated graphics port, and a processor or local bus using any of a variety of bus architectures.

Storage 1020 is physical storage that includes one or both of memory 1056 and storage device 1088, which store operating system 1012, application programs 1014, and application data 1016 according to any distribution. Non-removable memory 1022 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1022 includes main memory and is separate from or fabricated in a same integrated circuit as processor 1010. As shown in FIG. 10, non-removable memory 1022 stores firmware 1018 that is present to provide low-level control of hardware. Examples of firmware 1018 include BIOS (Basic Input/Output System, such as on personal computers) and boot firmware (e.g., on smart phones). In examples, removable memory 1024 is inserted into a receptacle of or is otherwise coupled to computing device 1002 and can be removed by a user from computing device 1002. Removable memory 1024 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1088 are present that are internal and/or external to a housing of computing device 1002 and are or are not removable. Examples of storage device 1088 include a hard disk drive, a SSD, a thumb drive (e.g., a USB (Universal Serial Bus) flash drive), or other physical storage device.

One or more programs are stored in storage 1020. Such programs include operating system 1012, one or more application programs 1014, and other program modules and program data. Examples of such application programs include computer program logic (e.g., computer program code/instructions) for implementing relational database system 102, request source 104, pre-processor 106/306, optimizer 108, execution engine 112, converter 114/314, parser 330, validator 332, operators 702-768, and flowcharts 800 and 900, or components or modules thereof (and/or any individual operations/steps thereof).

Storage 1020 also stores data used and/or generated by operating system 1012 and application programs 1014 as application data 1016. Examples of application data 1016 include web pages, text, images, tables, sound files, video data, and other data. In examples, application data 1016 is sent to and/or received from one or more network servers or other devices via one or more wired or wireless networks. Storage 1020 is used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1002 through one or more input devices 1030 and receives information from computing device 1002 through one or more output devices 1050. Input device(s) 1030 includes one or more of touch screen 1032, microphone 1034, camera 1036, physical keyboard 1038, and/or trackball 1040 and output device(s) 1050 includes one or more of speaker 1052 and display 1054. Each of input device(s) 1030 and output device(s) 1050 are integral to computing device 1002 (e.g., built into a housing of computing device 1002) or are external to computing device 1002 (e.g., communicatively coupled wired or wirelessly to computing device 1002 via wired interface(s) 1080 and/or wireless modem(s) 1060). Further input devices 1030 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1054 displays information, as well as operating as touch screen 1032 by receiving user commands and/or other information (e.g., by touch, finger gestures, virtual keyboard, etc.) as a user interface. Any number of each type of input device(s) 1030 and output device(s) 1050 are present, including multiple microphones 1034, multiple cameras 1036, multiple speakers 1052, and/or multiple displays 1054.

In embodiments where GPU 1042 is present, GPU 1042 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1042 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1044 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1028. In an example, NPU 1044 is configured for a data-driven parallel computing and is highly efficient at processing massive multimedia data such as videos and images and processing data for neural networks. NPU 1044 is configured for efficient handling of AI-related tasks, such as speech recognition, background blurring in video calls, photo or video editing processes like object detection, etc.

In embodiments disclosed herein that implement ML models, NPU 1044 can be utilized to execute such ML models, of which MLM 1028 is an example. For instance, where applicable, MLM 1028 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1044 is used to train MLM 1028. To train MLM 1028, training data is that includes input features (attributes) and their corresponding output labels/target values (e.g., for supervised learning) is collected. A training algorithm is a computational procedure that is used so that MLM 1028 learns from the training data. Examples of training inputs for ML model training include user position, angle, gesture, time of day, location, user crypto, etc. Parameters/weights are internal settings of MLM 1028 that are adjusted during training by the training algorithm to reduce a difference between predictions by MLM 1028 and actual outcomes (e.g., output labels). In some examples, MLM 1028 is set with initial values for the parameters/weights. A loss function measures a dissimilarity between predictions by MLM 1028 and the target values, and the parameters/weights of MLM 1028 are adjusted to minimize the loss function. The parameters/weights are iteratively adjusted by an optimization technique, such as gradient descent. In this manner, MLM 1028 is generated through training by NPU 1044 to be used to generate inferences based on received input feature sets for particular applications. MLM 1028 is generated as a computer program or other type of algorithm configured to generate an output (e.g., a classification, a prediction/inference) based on received input features and is stored in the form of a file or other data structure.

In examples, such training of MLM 1028 by NPU 1044 is supervised or unsupervised. According to supervised learning, input objects (e.g., a vector of predictor variables) and a desired output value (e.g., a human-labeled supervisory signal) train MLM 1028. The training data is processed, building a function that maps new data on expected output values. Example algorithms usable by NPU 1044 to perform supervised training of MLM 1028 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1028 is an LLM, MLM 1028 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1028 is trained to learn patterns from unlabeled data. For instance, in embodiments where MLM 1028 implements unsupervised learning techniques, MLM 1028 identifies one or more classifications or clusters to which an input belongs. During a training phase of MLM 1028 according to unsupervised learning, MLM 1028 tries to mimic the provided training data and uses the error in its mimicked output to correct itself (i.e., correct weights and biases). In further examples, NPU 1044 perform unsupervised training of MLM 1028 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1044 need not necessarily be present in all ML model embodiments. In embodiments where ML models are present, any one or more of processor 1010, GPU 1042, and/or NPU 1044 can be present to train and/or execute MLM 1028.

One or more wireless modems 1060 can be coupled to antenna(s) (not shown) of computing device 1002 and can support two-way communications between processor 1010 and devices external to computing device 1002 through network 1004, as would be understood to persons skilled in the relevant art(s). Wireless modem 1060 is shown generically and can include a cellular modem 1066 for communicating with one or more cellular networks, such as a GSM network for data and voice communications within a single cellular network, between cellular networks, or between the mobile device and a public switched telephone network (PSTN). In examples, wireless modem 1060 also or alternatively includes other radio-based modem types, such as a Bluetooth modem 1064 (also referred to as a "Bluetooth device") and/or Wi-Fi modem 1062 (also referred to as an "wireless adaptor"). Wi-Fi modem 1062 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1002 can further include power supply 1082, LI receiver 1084, accelerometer 1086, and/or one or more wired interfaces 1080. Example wired interfaces 1080 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1080 of computing device 1002 provide for wired connections between computing device 1002 and network 1004, or between computing device 1002 and one or more devices/peripherals when such devices/peripherals are external to computing device 1002 (e.g., a pointing device, display 1054, speaker 1052, camera 1036, physical keyboard 1038, etc.). Power supply 1082 is configured to supply power to each of the components of computing device 1002 and receives power from a battery internal to computing device 1002, and/or from a power cord plugged into a power port of computing device 1002 (e.g., a USB port, an A/C power port). LI receiver 1084 is useable for location determination of computing device 1002 and in examples includes a satellite navigation receiver such as a Global Positioning System (GPS) receiver and/or includes other type of location determiner configured to determine location of computing device 1002 based on received information (e.g., using cell tower triangulation, etc.). Accelerometer 1086, when present, is configured to determine an orientation of computing device 1002.

Note that the illustrated components of computing device 1002 are not required or all-inclusive, and fewer or greater numbers of components can be present as would be recognized by one skilled in the art. In examples, computing device 1002 includes one or more of a gyroscope, barometer, proximity sensor, ambient light sensor, digital compass, etc. In an example, processor 1010 and memory 1056 are co-located in a same semiconductor device package, such as being included together in an integrated circuit chip, FPGA, or system-on-chip (SOC), optionally along with further components of computing device 1002.

In embodiments, computing device 1002 is configured to implement any of the above-described features of flowcharts herein. Computer program logic for performing any of the operations, steps, and/or functions described herein is stored in storage 1020 and executed by processor 1010.

In some embodiments, server infrastructure 1070 is present in computing environment 1000 and is communicatively coupled with computing device 1002 via network 1004. Server infrastructure 1070, when present, is a network-accessible server set (e.g., a cloud-based environment or platform). As shown in FIG. 10, server infrastructure 1070 includes clusters 1072. Each of clusters 1072 comprises a group of one or more compute nodes and/or a group of one or more storage nodes. For example, as shown in FIG. 10, cluster 1072 includes nodes 1074. Each of nodes 1074 are accessible via network 1004 (e.g., in a "cloud-based" embodiment) to build, deploy, and manage applications and services. In examples, any of nodes 1074 is a storage node that comprises a plurality of physical storage disks, SSDs, and/or other physical storage devices that are accessible via network 1004 and are configured to store data associated with the applications and services managed by nodes 1074.

Each of nodes 1074, as a compute node, comprises one or more server computers, server systems, and/or computing devices. For instance, a node 1074 in accordance with an embodiment includes one or more of the components of computing device 1002 disclosed herein. Each of nodes 1074 is configured to execute one or more software applications (or "applications") and/or services and/or manage hardware resources (e.g., processors, memory, etc.), which are utilized by users (e.g., customers) of the network-accessible server set. In examples, as shown in FIG. 10, nodes 1074 includes a node 1046 that includes storage 1048 and/or one or more of a processor 1058 (e.g., similar to processor 1010, GPU 1042, and/or NPU 1044 of computing device 1002). Storage 1048 stores application programs 1076 and application data 1078. Processor(s) 1058 operates application programs 1076 which access and/or generate related application data 1078. In an implementation, nodes such as node 1046 of nodes 1074 operate or comprise one or more virtual machines, with each virtual machine emulating a system architecture (e.g., an operating system), in an isolated manner, upon which applications such as application programs 1076 are executed.

In embodiments, one or more of clusters 1072 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1072 are included in a datacenter in a distributed collection of datacenters. In embodiments, exemplary computing environment 1000 comprises part of a cloud-based platform.

In an embodiment, computing device 1002 accesses application programs 1076 for execution in any manner, such as by a client application and/or a browser at computing device 1002.

In an example, for purposes of network (e.g., cloud) backup and data security, computing device 1002 additionally and/or alternatively synchronizes copies of application programs 1014 and/or application data 1016 to be stored at network-based server infrastructure 1070 as application programs 1076 and/or application data 1078. In examples, operating system 1012 and/or application programs 1014 include a file hosting service client configured to synchronize applications and/or data stored in storage 1020 at network-based server infrastructure 1070.

In some embodiments, on-premises servers 1092 are present in computing environment 1000 and are communicatively coupled with computing device 1002 via network 1004. On-premises servers 1092, when present, are hosted within an organization's infrastructure and, in many cases, physically onsite of a facility of that organization. On-premises servers 1092 are controlled, administered, and maintained by IT (Information Technology) personnel of the organization or an IT partner to the organization. Application data 1098 can be shared by on-premises servers 1092 between computing devices of the organization, including computing device 1002 (when part of an organization) through a local network of the organization, and/or through further networks accessible to the organization (including the Internet). Furthermore, in examples, on-premises servers 1092 serve applications such as application programs 1096 to the computing devices of the organization, including computing device 1002. Accordingly, in examples, on-premises servers 1092 include storage 1094 (which includes one or more physical storage devices such as storage disks and/or SSDs) for storage of application programs 1096 and application data 1098 and include a processor 1090 (e.g., similar to processor 1010, GPU 1042, and/or NPU 1044 of computing device 1002) for execution of application programs 1096. In some embodiments, multiple processors 1090 are present for execution of application programs 1096 and/or for other purposes. In further examples, computing device 1002 is configured to synchronize copies of application programs 1014 and/or application data 1016 for backup storage at on-premises servers 1092 as application programs 1096 and/or application data 1098.

Embodiments described herein may be implemented in one or more of computing device 1002, network-based server infrastructure 1070, and on-premises servers 1092. For example, in some embodiments, computing device 1002 is used to implement systems, clients, or devices, or components/subcomponents thereof, disclosed elsewhere herein. In other embodiments, a combination of computing device 1002, network-based server infrastructure 1070, and/or on-premises servers 1092 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 1020. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules, or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1014) are stored in storage 1020. Such computer programs can also be received via wired interface(s) 1060 and/or wireless modem(s) 1060 over network 1004. Such computer programs, when executed or loaded by an application, enable computing device 1002 to implement features of embodiments discussed herein. Accordingly, such computer programs represent controllers of the computing device 1002.

Embodiments are also directed to computer program products comprising computer code or instructions stored on any computer-readable medium or computer-readable storage medium. Such computer program products include the physical storage of storage 1020 as well as further physical storage types.

III. Additional Example Embodiments

In one embodiment, a system is provided to convert vector-related requests into logical operator trees comprising query operators, the system enabling the vector operation without vector-specific executable code or operators. The system comprises: a database, a parser, a converter, an optimizer, and an execution engine. The database is associated with query operators that are non-vector-specific. The database stores a table with vector embeddings. The parser is configured to parse a vector-related request indicating a vector operation (e.g., create vector index, vector search, delete/add vectors) associated with the vector embeddings. The converter is configured to convert the vector operation into a logical operator tree comprising a representation of the vector-related request as a logical flow of the query operators. The optimizer is configured to convert the logical operator tree into an executable plan. The execution engine is configured to execute the executable plan against the table with vector embeddings.

In an embodiment, the database comprises a structured query language (SQL) database.

In an embodiment, the vector operation comprises a vector search. The system may further comprise a validator configured to validate the vector-related request at least in part by identifying a vector index applicable to the vector search. The logical flow of the query operators may indicate at least: a search vector for the vector search; a search of the vector index for K (approximate) nearest neighbor vector embeddings in the database relative to the search vector; and a computation of the K nearest neighbor vector embeddings in response to the query.

In an embodiment, the vector index comprises a graph of vector nodes and edges represented in tables stored in the database.

In an embodiment, the vector-related request comprises a query. The query comprises a hybrid query of vector data and non-vector data stored in the database. The logical operator tree comprises a logical subtree in a logical query plan.

In an embodiment, the vector-related request comprises a query and wherein the logical operator tree includes a sort operator (e.g., a top sort operator, or a priority queue operator) configured to compute multiple (e.g., compressed) vector distances in a single pass.

In an embodiment, the vector-related request comprises a request to generate a vector index for the vector embeddings.

In an embodiment, the logical operator tree represents the following operations: computing compressed (e.g., PQ) vectors for each of the vectors (e.g., in a base table); generating a graph based on at least a set of vectors of the compressed vectors; revising the graph by iteratively selecting a set of vectors from the compressed vectors, searching the graph, generating candidate edges between source and destination vectors in the selected set of vectors and in the graph, pruning the candidate edges; and storing the graph as the vector index.

In an embodiment, the vector-related request comprises a request to insert a vector embedding into the table or to delete a vector embedding from the table.

A computer-implemented method of converting vector-related requests into logical operator trees comprising query operators is provided, the computer-implemented method enabling the vector search of the database without vector-specific executable code or operators. In an embodiment, the computer-implemented method comprises: receiving a query indicating a vector search for vector embeddings in a database associated with query operators that are non-vector-specific; determining a vector index applicable to the vector search; converting the vector search into a logical operator tree comprising a representation of the query as a logical flow of the query operators; converting the logical operator tree into an executable query plan that references the vector index; and executing the executable query plan against the database by reading the referenced vector index.

In an embodiment, the database comprises a structured query language (SQL) database.

In an embodiment, the logical flow of the query operators indicates at least the following: a search vector for the vector search; searching the vector index for K nearest neighbor vector embeddings in the database relative to the search vector; and computing the K nearest neighbor vector embeddings in response to the query.

In an embodiment, the vector index comprises a graph of vector nodes and edges represented in tables stored in the database.

In an embodiment, the query comprises a hybrid query of vector data and non-vector data stored in the database and wherein the logical operator tree comprises a logical subtree in a logical query plan.

In an embodiment, the logical operator tree indicates at least one metric to measure distance between the search vector and the vector embeddings.

In an embodiment, the method may further comprise: receiving a request to generate the vector index for vector embeddings in the database; converting the request into a logical operator tree comprising a representation of the request as a logical flow of the query operators, the converting enabling the generation of the vector index without vector-specific executable code or operators; converting the logical operator tree into an executable query plan that references or creates the vector index; and executing the executable query plan against the database by creating the referenced vector index.

In an embodiment, the logical operator tree represents the following operations: computing compressed vectors for each of the vector embeddings; generating a graph based on at least a set of vectors of the compressed vectors; revising the graph by iteratively selecting a set of vectors from the compressed vectors, searching the graph, generating candidate edges between source and destination vectors in the selected set of vectors and in the graph, pruning the candidate edges; and storing the graph as the vector index.

In another embodiment, a computer-implemented method of converting vector-related requests into logical operator trees comprising query operators is provided, the computer-implemented method enabling the generation of a vector index without vector-specific executable code or operators. In an embodiment, the computer-implemented method comprises: receiving request to generate the vector index for vectors in the database associated with query operators that are non-vector-specific; converting the request into a logical operator tree comprising a logical flow of the query operators representing the request; converting the logical operator tree into an executable query plan that references the vector index; and executing the executable query plan against the database by creating the referenced vector index.

In an embodiment, the logical operator tree represents the following operations: computing compressed vectors for each of the vectors; generating a graph based on at least a set of vectors of the compressed vectors; revising the graph by iteratively selecting a set of vectors from the compressed vectors, searching the graph, generating candidate edges between source and destination vectors in the selected set of vectors and in the graph, pruning the candidate edges; and storing the graph as the vector index.

In an embodiment, a product quantization (PQ) vector pivot table computation, a medoid vector computation over the vectors, and said pruning are performed using an aggregate operator.

In still another embodiment, a computer-readable memory device having computer program code recorded thereon that when executed by at least one processor of a computing device causes the at least one processor to perform operations is provided. In an embodiment of the foregoing computer-readable memory device, the operations comprise any method described herein.

IV. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A database system enabling a vector operation without vector-specific executable code or operators, the database system comprising:
    a database associated with query operators that are non-vector-specific, wherein the database stores a table with vector embeddings;
    a parser configured to parse a vector-related request indicating the vector operation associated with the vector embeddings;
    a converter configured to convert the vector operation into a logical operator tree comprising a representation of the vector-related request as a logical flow of the query operators;
    an optimizer configured to convert the logical operator tree into an executable plan; and
    an execution engine configured to execute the executable plan against the table with vector embeddings.

2. The system of claim 1, wherein the database comprises a structured query language (SQL) database.

3. The system of claim 1, wherein the vector operation comprises a vector search, the system further comprising:
    a validator configured to validate the vector-related request at least in part by identifying a vector index applicable to the vector search;
    wherein the logical flow of the query operators indicates at least:
        a search vector for the vector search;
        a search of the vector index for K nearest neighbor vector embeddings in the database relative to the search vector; and
        a computation of the K nearest neighbor vector embeddings in response to the query.

4. The system of claim 3, wherein the vector index comprises a graph of vector nodes and edges represented in tables stored in the database.

5. The system of claim 3, wherein the vector-related request comprises a query, wherein the query comprises a hybrid query of vector data and non-vector data stored in the database, and wherein the logical operator tree comprises a logical subtree in a logical query plan.

6. The system of claim 3, wherein the vector-related request comprises a query and wherein the logical operator tree includes a sort operator configured to compute multiple vector distances in a single pass.

7. The system of claim 1, wherein the vector-related request comprises a request to generate a vector index for the vector embeddings.

8. The system of claim 7, wherein the logical operator tree represents the following operations:
    computing compressed vectors for each of the vectors;
    generating a graph based on at least a set of vectors of the compressed vectors;
    revising the graph by iteratively selecting a set of vectors from the compressed vectors, searching the graph, generating candidate edges between source and destination vectors in the selected set of vectors and in the graph, and pruning the candidate edges; and
    storing the graph as the vector index.

9. The system of claim 1, wherein the vector-related request comprises a request to insert a vector embedding into the table or to delete a vector embedding from the table.

10. A computer-implemented method enabling vector search of a database without vector-specific executable code or operators, the computer-implemented method comprising:
    receiving a query indicating a vector search for vector embeddings in a database associated with query operators that are non-vector-specific;
    determining a vector index applicable to the vector search;
    converting the vector search into a logical operator tree comprising a representation of the query as a logical flow of the query operators;
    converting the logical operator tree into an executable query plan that references the vector index; and
    executing the executable query plan against the database by reading the referenced vector index.

11. The computer-implemented method of claim 10, wherein the database comprises a structured query language (SQL) database.

12. The computer-implemented method of claim 10, wherein the logical flow of the query operators indicates at least the following:
    a search vector for the vector search;
    searching the vector index for K nearest neighbor vector embeddings in the database relative to the search vector; and computing the K nearest neighbor vector embeddings in response to the query.

13. The computer-implemented method of claim 10, wherein the vector index comprises a graph of vector nodes and edges represented in tables stored in the database.

14. The computer-implemented method of claim 10, wherein the query comprises a hybrid query of vector data and non-vector data stored in the database and wherein the logical operator tree comprises a logical subtree in a logical query plan.

15. The computer-implemented method of claim 10, wherein the logical operator tree indicates at least one metric to measure distance between the search vector and the vector embeddings.

16. The computer-implemented method of claim 10, further comprising:
   receiving a request to generate the vector index for vector embeddings in the database;
   converting the request into a logical operator tree comprising a representation of the request as a logical flow of the query operators, the conversion enabling the generation of the vector index without vector-specific executable code or operators;
   converting the logical operator tree into an executable query plan that references or creates the vector index; and
   executing the executable query plan against the database by creating the referenced vector index.

17. The computer-implemented method of claim 10, wherein the logical operator tree represents the following operations:
   computing compressed vectors for each of the vector embeddings;
   generating a graph based on at least a set of vectors of the compressed vectors;
   revising the graph by iteratively selecting a set of vectors from the compressed vectors, searching the graph, generating candidate edges between source and destination vectors in the selected set of vectors and in the graph, and pruning the candidate edges; and
   storing the graph as the vector index.

18. A computer-implemented method enabling generation of a vector index without vector-specific executable code or operators, the computer-implemented method comprising:
   receiving a request to generate the vector index for vectors in the database associated with query operators that are non-vector-specific;
   converting the request into a logical operator tree comprising a logical flow of the query operators representing the request;
   converting the logical operator tree into an executable query plan that references the vector index; and
   executing the executable query plan against the database by creating the referenced vector index.

19. The computer-implemented method of claim 18, wherein the logical operator tree represents the following operations:
   computing compressed vectors for each of the vectors;
   generating a graph based on at least a set of vectors of the compressed vectors;
   revising the graph by iteratively selecting a set of vectors from the compressed vectors, searching the graph, generating candidate edges between source and destination vectors in the selected set of vectors and in the graph, pruning the candidate edges; and
   storing the graph as the vector index.

20. The computer-implemented method of claim 19, wherein a product quantization (PQ) vector pivot table computation, a medoid vector computation over the vectors, and said pruning are performed using an aggregate operator.

* * * * *